(12) United States Patent
Brewster

(10) Patent No.: US 7,896,593 B2
(45) Date of Patent: Mar. 1, 2011

(54) LATCH DEVICE FOR SECURING CARGO CONTAINERS TOGETHER AND/OR TO VEHICLE DECKS

(75) Inventor: John B. Brewster, Homewood, IL (US)

(73) Assignee: Holland, L.P., Crete, IL (US)

( * ) Notice: Subject to any disclaimer, the term of this patent is extended or adjusted under 35 U.S.C. 154(b) by 410 days.

(21) Appl. No.: 11/893,071

(22) Filed: Aug. 14, 2007

(65) Prior Publication Data

US 2009/0047090 A1 Feb. 19, 2009

(51) Int. Cl.
*B60P 7/08* (2006.01)

(52) U.S. Cl. .................. 410/70; 410/69; 410/76; 24/287

(58) Field of Classification Search ............ 410/69, 410/70, 72, 73, 76, 80; 292/109, 121; 24/287; 248/503, 681
See application file for complete search history.

(56) References Cited

U.S. PATENT DOCUMENTS

| | | | |
|---|---|---|---|
| 3,365,229 | A | 1/1968 | Hitch et al. |
| 3,603,267 | A | 9/1971 | Schwiebert |
| 3,604,363 | A | 9/1971 | Smith |
| 3,604,364 | A | 9/1971 | Sweger |
| 3,628,222 | A | 12/1971 | Palen |
| 3,630,155 | A | 12/1971 | Marulle |
| 3,744,551 | A | 7/1973 | Gunnergaard |
| 4,236,853 | A | 12/1980 | Niggemeier et al. |
| 4,277,212 | A | 7/1981 | Rosaia |
| 4,372,715 | A | 2/1983 | Naffa |
| 4,382,734 | A | 5/1983 | Synowiec et al. |
| 4,382,735 | A | 5/1983 | Synowiec |
| 4,430,032 | A | 2/1984 | Morgan |
| 5,090,638 | A | 2/1992 | Eilenstein-Wiegmanns et al. |
| 5,106,247 | A | 4/1992 | Hove et al. |
| 5,560,088 | A | 10/1996 | Nitsche et al. |
| 5,570,981 | A | 11/1996 | Brewster |
| 5,797,169 | A | 8/1998 | Donner et al. |
| 6,537,002 | B2 * | 3/2003 | Gloystein ............ 410/69 |
| 7,114,898 | B2 | 10/2006 | Brewster |

* cited by examiner

*Primary Examiner* — Stephen Gordon
(74) *Attorney, Agent, or Firm* — Meroni & Meroni, P.C.; Charles F. Meroni, Jr.; Christopher J. Scott

(57) ABSTRACT

An improved cargo container securement device includes a housing defined by a base which forms a planar surfacing thereabout on which cargo container corner fittings rest in applied relation on the container relative to the supporting structure or platform involved. The container securement device includes a flanged end which engages a cargo container corner casting aperture opening or an appropriate aperture and utilizes the structure for retention of the securement device so the opposite side of the hold down device is allowed to automatically engage and disengage with a cargo container corner fitting as necessary to achieve proper handling and transport of cargo containers. The hold down device includes an indicator to visually signal that the automatic hold down feature of the device is engaged or disengaged with a cargo container corner fitting of cargo containers.

6 Claims, 15 Drawing Sheets

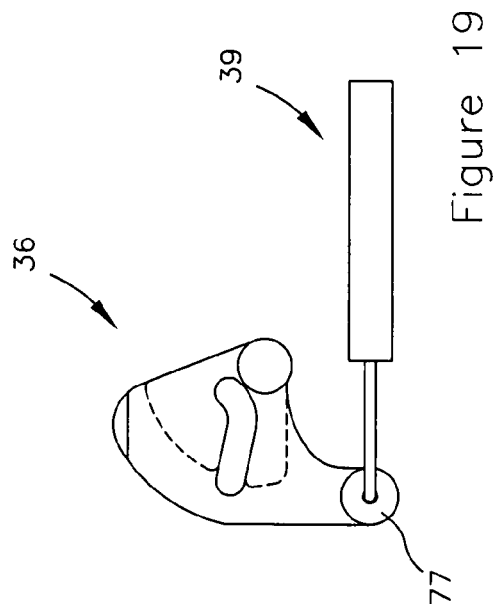
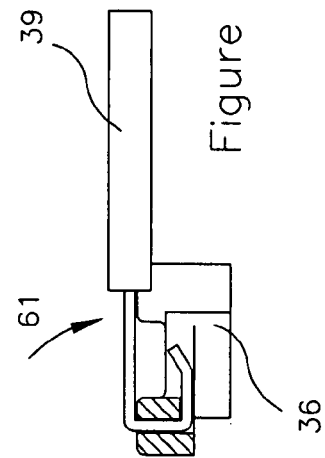
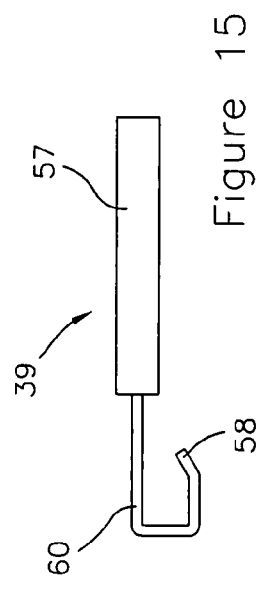
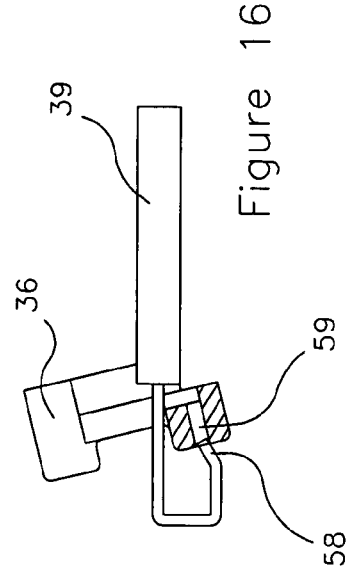
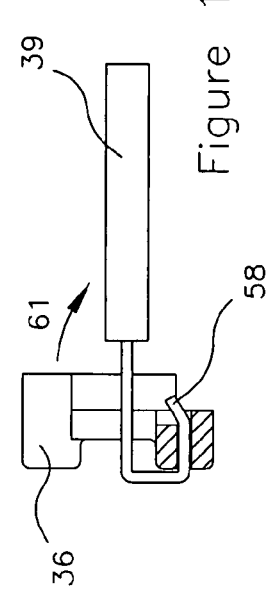

Figure 24

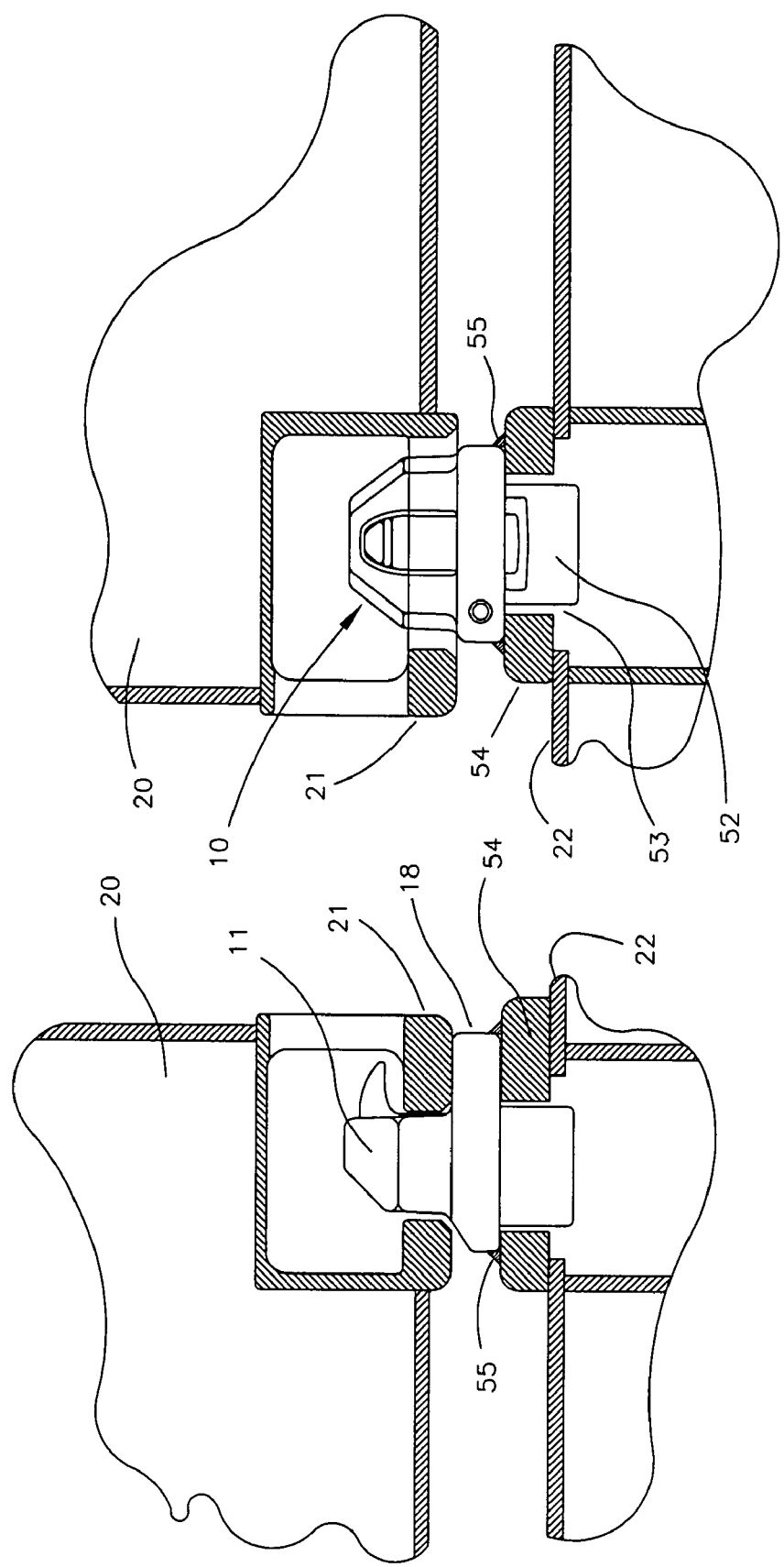

LATCH DEVICE FOR SECURING CARGO CONTAINERS TOGETHER AND/OR TO VEHICLE DECKS

BACKGROUND OF THE INVENTION

1. Field of the Invention

The invention relates to container securement devices, and more particularly, to improvements in cargo container securement devices of the type that provides automatic securement and release of a cargo container. The device is mountable and demountable on a deck or frame of a vehicle so that the device can be adapted to different load conditions including a different mix of containers of different length and the like while having unused devices not interfere with the flush mounting of long containers.

2. Description of Related Art

U.S. Pat. No. 3,365,229 teaches a top coupler means for interlocking a pair of opposed container corner brackets to provide for a tandem coupling of said containers, said top coupling means including a pair of first and second severable top coupler elements, each element having a clamp portion for engagement with respective corner bracket and a spacer portion engageable with the spacer portion of the other element attendant to space separation of one corner bracket from the other, said first top coupler element being provided with one coupler element interlock portion and said second top coupler element being provided with another coupler interlock portion for intercoupling with the one interlock portion, and means for pivotally interlocking one element with the other, and bottom coupling means for coupling the bottoms of the containers together, and hoisting means therefore.

U.S. Pat. No. 3,603,267 teaches a supporting and securement structure adapted to use on carrier vehicles, including railway flatcars, for the transportation of varied sizes and numbers of box-type containers in which merchandise is shipped; said structure having guide tracks secured to the carrier vehicle structure and one-piece pedestal type supports with integral support portions retained within the guide tracks for movement therealong to predetermined positions of securement and swingable around said support portions between upright and collapsed positions, the support pedestals being constructed and propelled for relative stability in their upright positions and collapsible into relatively small openings in the guide tracks themselves to close said openings when not in use.

U.S. Pat. No. 3,604,363 teaches spring-biased latches on a transport carrier for automatically engaging and disengaging bottom corner container fittings are bodily movable to maintain the same latching engagement within limits for various clearances between the container fittings and the housings secured to the transport carrier on which the latches are mounted.

U.S. Pat. No. 3,604,364 teaches fittings at the corners of a container that are automatically latched to a railway car when it is lowered thereon and unlatched therefrom when the container is lifted from transport position. Each fitting is received in a housing on the car on which a bellcrank latch is mounted to pivot about a pair of spaced axes under the biasing action of a coil compression spring reacting between the housing and the distal end of one arm of the latch. The distal end of the other arm of the latch has latching engagement with the respective container fitting. The housings are slidable along slots extending lengthwise along opposite sides of the car and can be swung to retracted positions on trunnions extending below the floor or deck of the car. The trunnions are located in spaced relation to the latches to cause them to maintain latching engagement with the container on upward movement of it during transport. The retracted housings are arranged to be bypassed by other housings slidable along the slots.

U.S. Pat. No. 3,628,222 teaches a latching mechanism having two pivotally mounted and interacting members. This mechanism provides for automatic locking when moved to the latched position with provisions for unlocking when unlatching is desired. The latching mechanism is particularly adaptable for use in latching shipping containers to the bed of transporting vehicles.

U.S. Pat. No. 3,630,155 teaches a railroad car container bracket mounted on transverse sideplate means attached periodically to the sides of the railroad car deck. The bracket is pivoted on an axis transverse to the longitudinal centerline of the car and constructed in such a manner as to prevent longitudinal, transverse, and vertical movement of a container. When the brackets are in position supporting the four bottom corners of a container, the bracket will transmit impact forces to the deck of the railway car in a unique manner which shields the bracket pivot pin from damaging shearing forces. The bracket also contains a spring-loaded pivot latch which prevents dislodgment of the container in a vertical direction, especially when the container is empty and subjected to high wind loading which tends to tip an empty container from the deck of the container car.

U.S. Pat. No. 3,774,551 teaches a spring biased latch lever is variably pivoted on the housing of container securing means on a transport carrier to accommodate minimum and maximum clearances between the container securing means and the bottom container fitting mounted thereon.

U.S. Pat. No. 4,236,853 teaches a coating of cadmium applied to a container pedestal latch protuberance lowers the maximum exit force sufficiently as to be within the 2200 pound maximum in the AAR specification while the minimum exit force of 1600 pounds and the maximum container entry force of 800 pounds were also within the specification.

U.S. Pat. No. 4,277,212 teaches a connector for use in the securement of a first member, such as a cargo container, to a base support includes a base member, a post member extending from the base member in one direction and an attaching means for attaching the connector to the base support extending from the base member in the other direction. Restraining means provides vertical restraint to the container when the post member is positioned to extend into the opening of the web of the corner casting thereof and the container is restrained from movement in at least one horizontal direction. In one form, a restraining surface for the container is located on a cam pivotally mounted by the post member and in a second form, a restraining surface for the container is on the post member itself. The cam of the first form is pivotally mounted so that in response to lifting movement, the cam is rotated about its axis to act upon the web portion to impact a force horizontally whereby the container, in loading, follows a path similar to that in loading. In the second form, a plunger, under a force of compression of a spring, acts on the web portion to provide a similar function.

U.S. Pat. No. 4,372,715 teaches a punch type release lock intended for use primarily in retaining load supports such as pallets in locked position in an aircraft. The lock comprises a detent mechanism which is inserted into a recess preferably at the side of the load support. A preferred form of detent mechanism comprises a pair of relatively movable elements, at least one of which is pivoted. The elements include abutments which are movable apart as the elements are inserted into the recess. When a load is applied to the pivoted detent, as for example, by a parachute extracting system, movement of the element in a direction to withdraw the element to release the load support is prevented by a load cell comprising a fuse plate and punch, in which the punch is prevented from movement by the fuse plate until attainment of a predetermined load on the pivoted detent element. At the predetermined load, the punch penetrates the fuse plate and upon penetration of the fuse plate, the punch is relatively freely movable to effectively permit the load support to move the pivoted detent element to completely release the load support.

U.S. Pat. No. 4,382,734 teaches a container pedestal for supporting and securing a cargo container having a catch opening on a vehicle such as a rail car. The pedestal includes a base defining a platform for supporting the container. A pivotal latch lever is biased by a spring into a latched position wherein a latching nose on the lever registers with a latch recess in the container. The latch nose is contacted for pivoting the latch lever from the latched to a released position when the container is raised or lowered. The latch lever can be manually locked, yet self-entry automatic loading can be carried out in the locked condition. A line contact between the latch lever and the spring provides reliable and consistent latch operation due to a uniform spring lever arm length.

U.S. Pat. No. 4,382,735 teaches a container pedestal for supporting and securing a cargo container having a catch opening on a vehicle such as a rail car. The pedestal includes a base defining a platform for supporting the container. A pivotal latch lever is biased by a spring into a latched position wherein a latching nose on the lever registers with a latch recess in the container. The latch nose is contacted by the container for pivoting the latch lever from the latched to a released position when the container is raised or lowered. The latch lever can be manually locked, yet self-entry automatic loading can be carried out in the locked condition. A line contact between the latch lever and the spring provides reliable and consistent latch operation due to a uniform spring lever arm length.

U.S. Pat. No. 4,430,032 teaches a latch for locking a container to a pedestal on the flat deck of a flat car and particularly containers containing flammable materials. The container is supported on a pedestal at each corner thereof and the pedestals are adjustably mounted in guideways for movement along the deck of the flat car in accordance with the length of the container, to support containers at selected intervals along the car. A spring biased latch is provided to lock the container to the pedestal and a lock is provided for the latch is provided which reacts against the pedestal and includes a biasing spring for the lock to positively hold the latch in a locked position even though the car should be derailed.

U.S. Pat. No. 4,626,155 teaches a device for automatically securing a cargo container to a support such as a deck of a vehicle or a second container with the first container is to be stacked. The device includes a base having a projecting shear block received in the locking opening of the container. A head rotates between an unlocked or loading position in which the head moves through the locking opening and a locked position in which the container is secured. Automatic entry and release are provided by a spring within the biasing the head to the locked position but permitting movement to the unlocked position when torque is applied by engagement of the container with a cam surface on the head. Visible indication of the locked position and positive locking of the head in the locked position may be provided. For stacked containers, two aligned shear blocks and two angularly offset heads are provided and the spring may be released for manual locking of the device to one container followed by automatic locking to the second container.

U.S. Pat. No. 5,090,638 teaches a locking mechanism for tying down a piece of freight on a loading floor in an aircraft has a housing recessed in the loading floor. A latch opening member and a latching member are journalled in the housing to tilt toward each other or away from each other. Follower cams of the latching member ride in respective cam guide tracks of the latch operating member. A tension spring tends to bias the latching member and the latch operating member in opposite directions in a freight latching position or into a recessed beyond dead center position. Stop members are so positioned on the latch operating member and on the latching member that the latter cannot be tilted without activating the latch operating member which can be rolled over by a piece of freight in one direction when projecting from the housing and in the other direction when recessed into the housing.

U.S. Pat. No. 5,106,247 teaches an automatic hold down and locking as well as automatic load configuration change capability device system, which can be used to hold down and lock either one long container or several shorter containers within the same loading space, regardless of the outside width or width of bottom side rail flange on the container. The locking device system has four fixed non-retractable fully automatic locking devices positioned on the load carrier at the four outer standard locking points of each long container, and at least two retractable fully automatic locking devices positioned at the long side of the load carrier between and in line with the outer locking points.

U.S. Pat. No. 5,560,088 teaches a coupling piece includes an abutment and locking member which is shiftable relative to the abutment to allow for an automatic and reliable locking of the containers. The coupling pieces do not jam when the connection is released by means of slightly tilting the upper container. The coupling piece is particularly suitable for automatically locking and releasing tightly stowed containers, especially 20' containers. In an alternate embodiment, a coupling piece is shaped such that the entire coupling piece is shifted to a locking position when containers are placed on top of one another.

U.S. Pat. No. 5,570,981 teaches a cargo container hold down device that includes a shear block defining a base and a housing therefore that is shaped so that the base forms a planar surfacing thereabout on which the cargo container fitting rests in the applied relation of the container relative to the supporting platform involved; the shear block housing pivotally mounts a latch device comprising a latch member that includes a nose portion having an upper cam surfacing for engagement by a correspondingly located container mounted corner fitting, and an under cam surfacing disposed for engagement by such correspondingly located container mounted corner fitting on removal of such container therefrom, the latch member being biased outwardly of the shear block housing to dispose the nose thereof over the container corner fitting supporting surface of the shear block housing, and including an element for withdrawing such latch member within the shear block housing about one pivot axis when the container is applied to the device, and an element for withdrawing such latch member within the shear block housing about a separate axis that is spaced from and parallels the first indicated pivot axis when the container is removed from such device, so as to achieve a smooth and easier loading of the container, and provide for increased force for cam positioning of the device latch member for container removal purposes.

U.S. Pat. No. 5,797,169 teaches a coupling piece for the detachable connection of corner fittings of adjacent containers, especially of containers stacked one above the other on board ships. In order to reduce the manual effort involved in coupling together containers, semi-automatic coupling pieces are known which only need to be manually attached to one container and pre-locked. A full locking after the containers have been placed one on top of the other is effected automatically. Coupling pieces of this type require however, in many respects, a complex automatic actuating mechanism. In order to simplify the automatic actuating mechanism, a plurality of stop faces are provided, which are offset to one another on the locking bolt and which can be brought alternately into a corresponding position to a stop face on a spring-loaded ram. The contact of a stop face of the locking bolt against the stop face of the spring-loaded ram enables the locking bolt to be fixed simply and reliably in the respectively intended position of its crossbolts.

U.S. Pat. No. 7,114,898 teaches a cargo container hold down device that includes a housing defined by a base which forms a planar surfacing thereabout on which cargo container corner fittings rests in the applied relation on the container relative to the supporting structure or platform involved. The hold down device includes a flanged end which engages a cargo container corner casting aperture opening or an appropriate aperture and utilizes the structure for retention of the hold down device so the opposite side of the hold down device is allowed to automatically engage and disengage with a cargo container corner fitting as necessary to achieve proper handling and transport of cargo containers. This opposite side of the hold down device consists of a shear block housing that pivotally mounts a latch device comprising a latch member that includes a nose portion having an upper cam surfacing for engagement by a correspondingly located container mounted corner fitting, and an under cam surfacing disposed for engagement by such correspondingly located container mounted corner fitting on removal of such container therefrom, the latch member being biased outwardly of the shear block housing to dispose the nose thereof over the container corner fitting supporting surface of the shear block housing, and an element for withdrawing such latch member within the shear block housing about a separate axis that is spaced from and substantially perpendicular to the indicated pivot axis when the container is removed from such device, so as to achieve a smooth and easier loading of the container, and provide for increased force for cam positioning of the device latch member for container removal purposes.

In addition to the foregoing patent disclosures, it should be further noted that a company known as Peck & Hale has offered for sale a model F665 Safe-T-Loc Stacker container lock, believed to be more than seven years prior to the filing date of this application.

It will be seen that the forgoing prior art teaches certain parameters for container locks and use various complex solutions to meet the needs taught. Additionally, it may be seen that the prior art typically uses either complex spring mounting and seating arrangements or spring mounting and/or seating arrangements that are difficult to work with, particularly when changing broken springs or replacing springs with appropriately calibrated springs.

SUMMARY OF THE INVENTION

The instant invention departs from the prior art in that it eliminates the complexity of the mechanisms otherwise presented by the prior art, and provides a mechanism of superior functionality. The latch device of the present invention achieves these objectives by way of a housing with several camming surfaces, a latch with specific geometry to engage the surfaces in the housing, and a corner casting of the container. A spring of the presently disclosed latch device moves through required motions and imparts required loads and resistance to forces, yet further provides a simple, strong and efficient structure with a minimized number of parts, notably without a latch pivot. In other words, the instant invention utilizes simple, yet high performance spring mounting and seating.

More particularly, the present specification presents and discloses a latch device for securing cargo containers to a vehicle deck and/or two cargo containers together, which latch device comprises a uniquely configured housing containing a latch mechanism that extends outwardly from the housing to engage a cargo container corner casting. An opposing side of the housing has two flanges projecting therefrom in a generally "T" shaped plan form.

In the case where two cargo containers are to be secured together, the flanges are inserted into the aperture of a cargo containers corner fitting manually and oriented in such a manner as to prevent its removal. The appropriate corner fitting of the other cargo container is brought into contact with the exposed end of the device's latch mechanism that extends outwardly from the housing to engage the cargo container corner casting and secure the two cargo containers together. When appropriate force is exerted to pull the two cargo containers apart, the device's latch mechanism that extends outwardly from the housing will automatically retract into the devices housing allowing the two cargo containers to be separated. The device provides additional visual indication when the devices latch mechanism is positioned in other than the normal unbiased position.

In the case where a cargo container is to be secured to a deck or frame of a vehicle, the flanges are inserted into the aperture of a deck or frame of a vehicle manually and oriented in such a manner as to prevent its removal. The appropriate corner fitting of the cargo container is brought into contact with the exposed end of the device latch mechanism that extends outwardly from the housing to engage the cargo container corner casting and secure it to the deck or frame of a vehicle. When appropriate force is exerted to pull the cargo container off of the deck, the device's latch mechanism that extends outwardly from the housing will automatically retract into the device's housing allowing the cargo container to be removed.

BRIEF DESCRIPTION OF THE DRAWINGS

Other features of my invention will become more evident from a consideration of the following brief description of patent drawings:

FIG. 15 is a top plan view of the indicator for the latch device.

FIG. 16 is a bottom plan view of the indicator clip end starting to be inserted into the bottom hub cavity of the link arm for the latch device.

FIG. 17 is a bottom plan view of the flexible indicator clip end disposed further through the bottom hub cavity of the link arm for the latch device.

FIG. 18 is a bottom plan view of the flexible indicator clip end disposed further through the bottom hub cavity of the link arm with the link arm substantially positioned forming an assembly for proper use for the latch device.

FIG. 19 is a side elevational view of the bottom view shown in FIG. 18 of the flexible indicator clip end disposed further through the bottom hub cavity of the link arm with the link arm substantially positioned forming an assembly for proper use for the latch device.

FIG. 24 is a sectional side elevational view of the housing for the latch device showing the said flexible indicator and link arm assembly seated within said housing cavity for the latch device ready for use.

FIG. 52 is a lateral side elevational view of the latch device appropriately retained between a cargo container on the top and an appropriate vehicle deck on the bottom, said device represents being welded to the vehicle deck.

FIG. 53 is a longitudinal side elevational view of the latch device appropriately retained between a cargo container on the top and an appropriate vehicle deck on the bottom, said device represents being welded to the vehicle deck.

DETAILED DESCRIPTION OF THE PREFERRED EMBODIMENT

Figure 1:
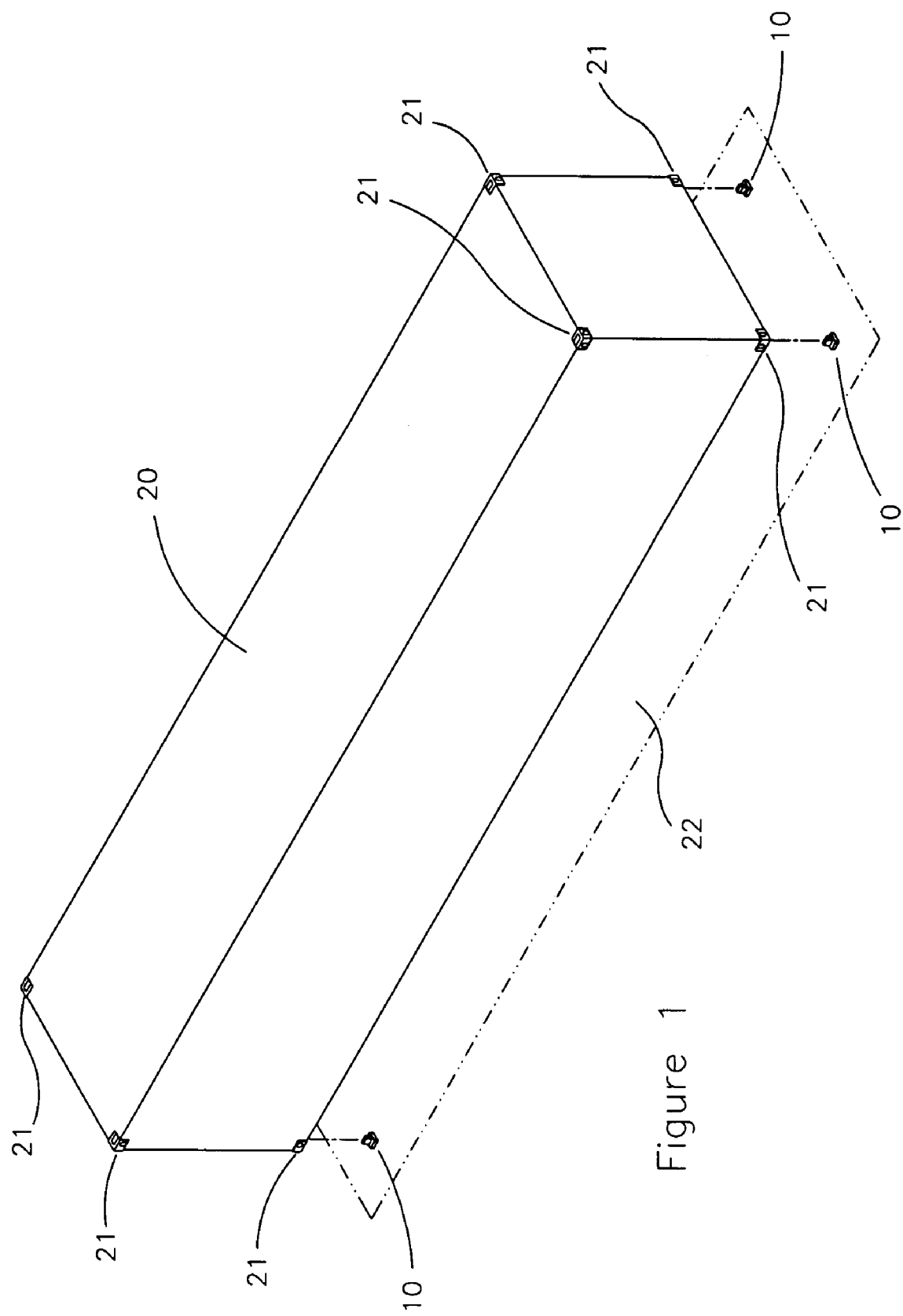
FIG. 1 is a largely schematic perspective view of a support surface to which the indicated pairs of container support or hold down devices have been applied, and a cargo container is to be supported thereon, which support surface may be, for instance, the deck of a railroad car.
Figure 2:
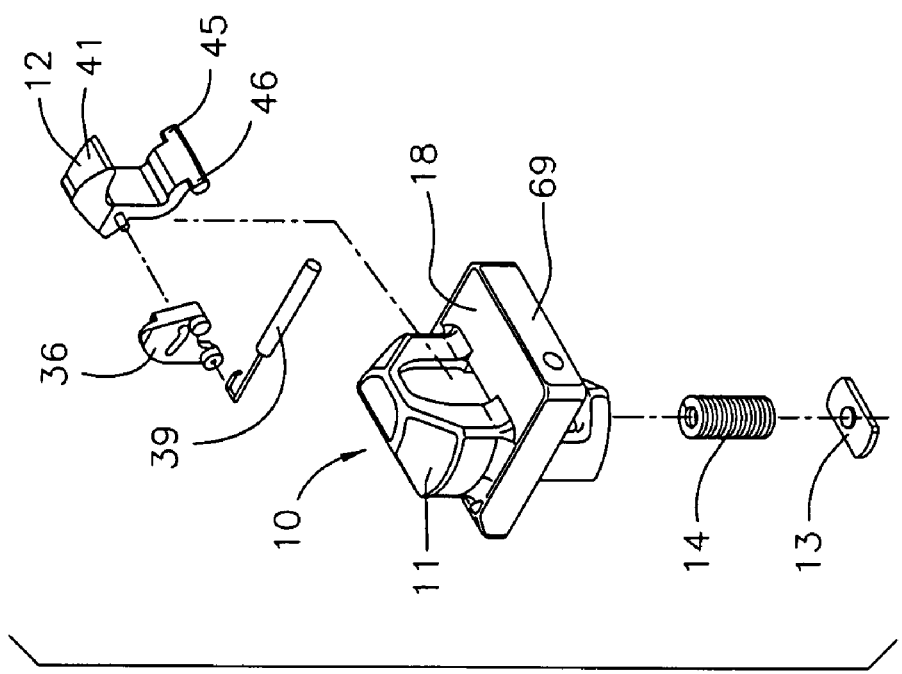
FIG. 2 is an exploded perspective view of one of the cargo container lock or securement devices arranged in accordance with the invention.

Referring now to the drawings with more specificity, it may be seen from an inspection of FIG. 1, that there is illustrated in somewhat of a diagrammatic manner a support 22 upon which a cargo container 20 is to be secured by Applicant's improved securement devices 10 that, in this regard, are arranged in accordance with FIGS. 2 through 53 of this application, and in accordance with the principles of the present invention herein disclosed. The support 22 may, for instance, be a deck or floor of a railroad flat car or other rail transport vehicle, or support 22 may be another type of vehicle to which the device 10 is applied in multiples of four for the usual application thereof to cargo container corner fittings 21 or the like.

Figure 3:
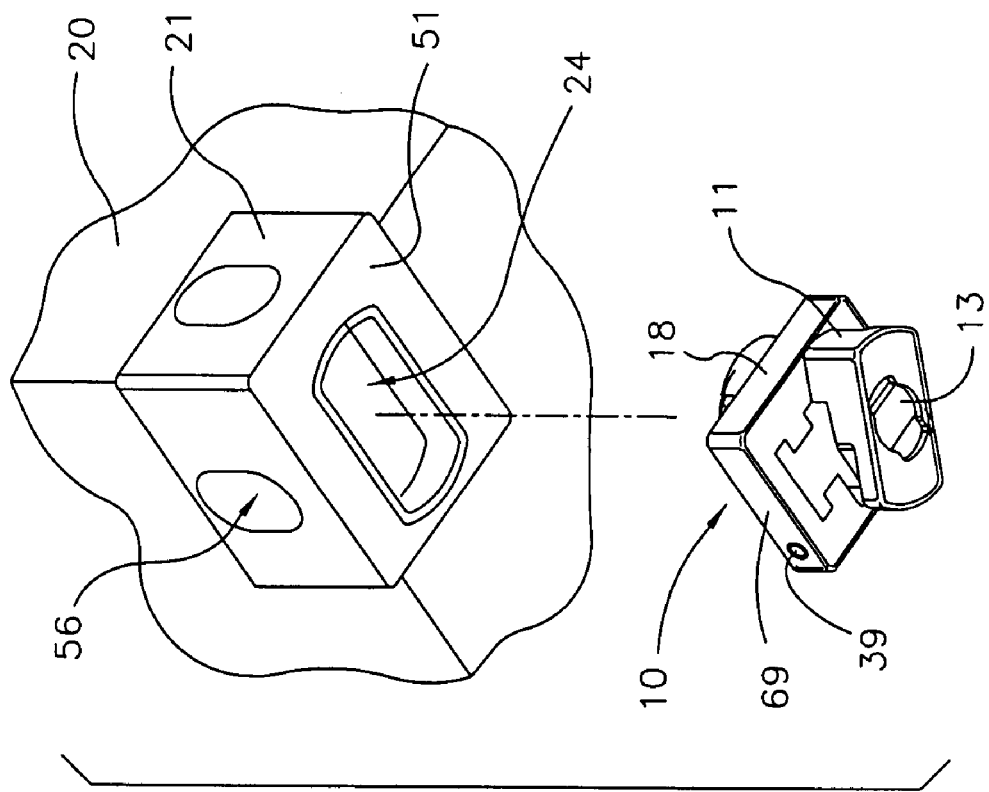
FIG. 3 is a diagrammatic perspective view showing the container lock or securement device of FIG. 2 assembled and disposed to receive the conventional lower corner fitting of a cargo container that is being lowered onto same; the securement device of FIG. 3 is shown deliberately separated from, for instance, a railroad car deck, that normally supports same, to expose the underside of same for disclosure purposes.

The principles of the present invention are applicable to devices for securing various types of containers to various types of supports. In the illustrated embodiment of the invention, the cargo containers 20 are identical and are of the usual cuboid configuration that is involved in standard and modular forms of containers of this type as illustrated. Each of the four lower corners of each container 20 includes a corner fitting 21 in the nature of a corner casting that may be of the type specified by the standards of the Association of American Railroads. The corner fitting 21 defines an upwardly or downwardly facing horizontal wall 51 (see FIG. 3) that defines an opening 24 that is of the familiar quadrilateral configuration.

In accordance with the present invention, portions of the securement devices 10 are intended to protrude through the locking opening 24 of the individual container corner fittings to achieve securement and automatic entry and release of the respective containers 20 as hereinafter disclosed. In other words, the lock or securement device 10 of the present invention is illustrated in detail in FIGS. 2 through 53, which figures and securement device are described in greater detail hereinafter.

Figure 4:
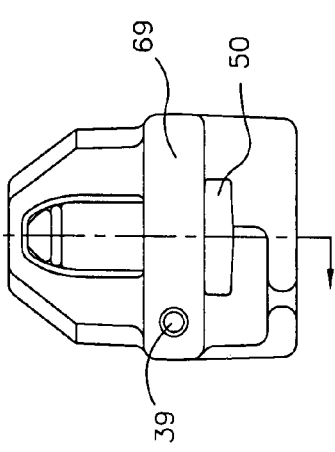
FIG. 4 is a side elevational view of the latch device for cargo containers.

The latch device or securement device 10 according to the present invention comprises a multifaceted housing 11, a latch 12, a retainer 13, a spring 14, a link arm 36 and an indicator 39. An exploded perspective view of the device 10 is shown in FIG. 2. An assembled side lateral view of device 10 is shown in FIG. 4. The housing 11 has flanges 15 and 16 which extend outwardly from the housing which engage a cargo containers corner casting aperture opening 24 or a vehicle deck's comparable aperture opening 23 as referenced in FIG. 50. The housing 11 has a base 18 which is sandwiched, or designed for spatial orientation, between two cargo containers corner fittings 21 or a cargo containers corner fittings 21 and a vehicle deck's appropriate structure and surface 25.

Figure 48:
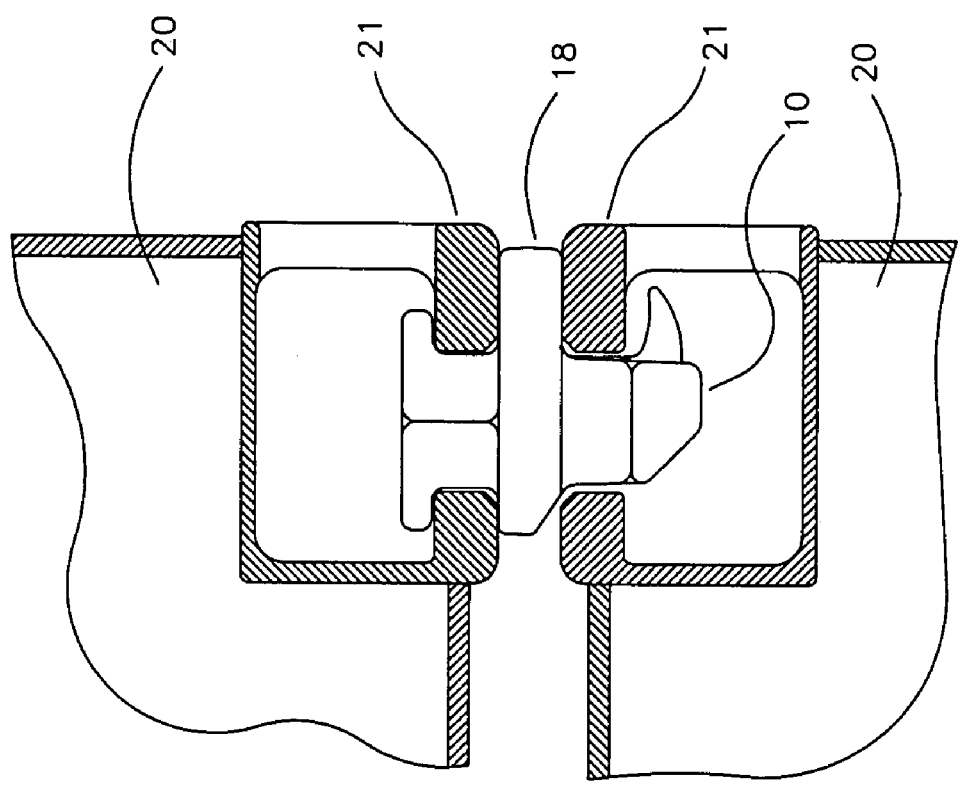
FIG. 48 is a lateral side elevational view of the latch device appropriately retained between two cargo containers.
Figures 50, 51:
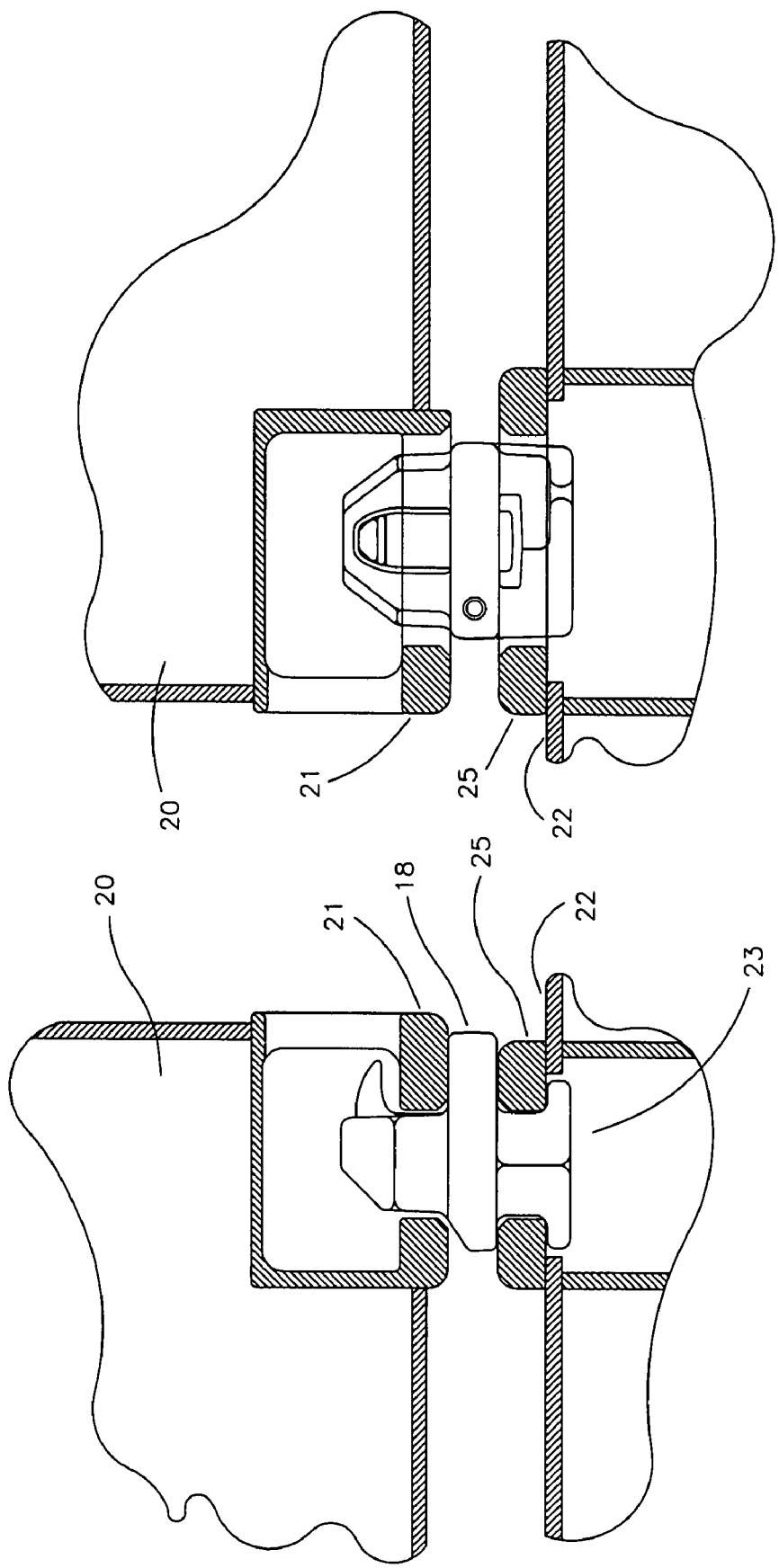
FIG. 50 is a lateral side elevational view of the latch device appropriately retained between a cargo container on the top and an appropriate vehicle deck on the bottom.
FIG. 51 is a longitudinal side elevational view of the latch device appropriately retained between a cargo container on the top and an appropriate vehicle deck on the bottom.

The illustrations within this document show that the vehicle deck's appropriate structure and surface 25 is identical to the same aperture shape, size, and structure thickness of a standard cargo container corner casting. This is desirable so that the latch device 10 maybe utilized for orientating with latch 12 upwards as shown in FIG. 50 or downwards as shown in FIG. 48. It is to be noted that the scope of the design of latch device 10 is not to be limited to an appropriate structure and surface 25 being identical to a cargo containers corner fittings 21. Housing 11 and flanges 15 and 16 are allowed to be varied so as to engage an appropriate deck aperture that is defined by the user.

Figure 9:
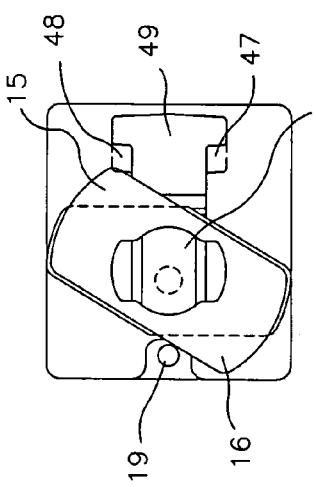
FIG. 9 is an alternate bottom plan view other than FIG. 8 of the latch device for cargo containers showing an alternate bottom housing shape which maybe utilized when the said latch device is being applied to a support surface that does not require the housings bottom flanges, such as in the case of welding the housing to a support surface.

The illustration in FIG. 9 shows an example of the tailorability of housing 11 where instead of flanges 15 and 16, the bottom end of housing 11 may be formed into a round cylinder shape 52 which is capable of containing retainer 13 and spring 14. FIGS. 52 and 53 show a side and frontal view respectively of device 10 securing a cargo container 20 to the vehicle decks appropriate structure 22. In this regard, it may be seen from a comparative inspection of FIGS. 52 and 53 that an appropriate container-borne structure 54 allows device 10 to be supported with proper provisions 53 for shape 52 of housing 11. FIGS. 52 and 53 show the example of how housing 11, if made of appropriate materials, may be fastened to surface 54 by welds 55.

Figure 49:
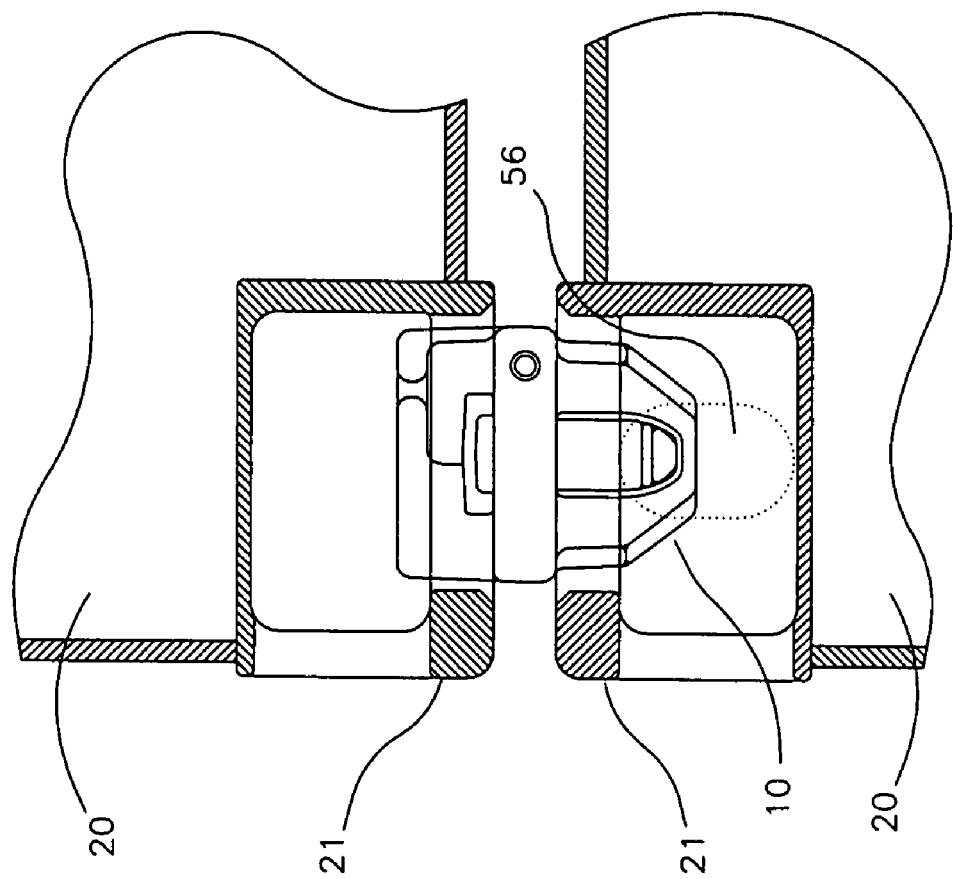
FIG. 49 is a longitudinal side elevational view of the latch device appropriately retained between two cargo containers.

There are two typical application uses for latch device 10. One application of latch device 10 is for securing standard cargo containers 20 together by latching their corner castings 21, as may be seen from an inspection of the partial side sectional views in FIGS. 48 and 49. The other typical application of latch device 10 is for securing a standard cargo container 20 onto a vehicle deck or frame 22 such as shown in FIGS. 50, 51, 52 and 53.

It is to be observed that the pivot and contact areas 34, 45 and 46 of latch 12 during the engagement and release action of latch device 10 are similar to the art disclosed in U.S. Pat.

Figures 37, 38, 39, 40, 41:
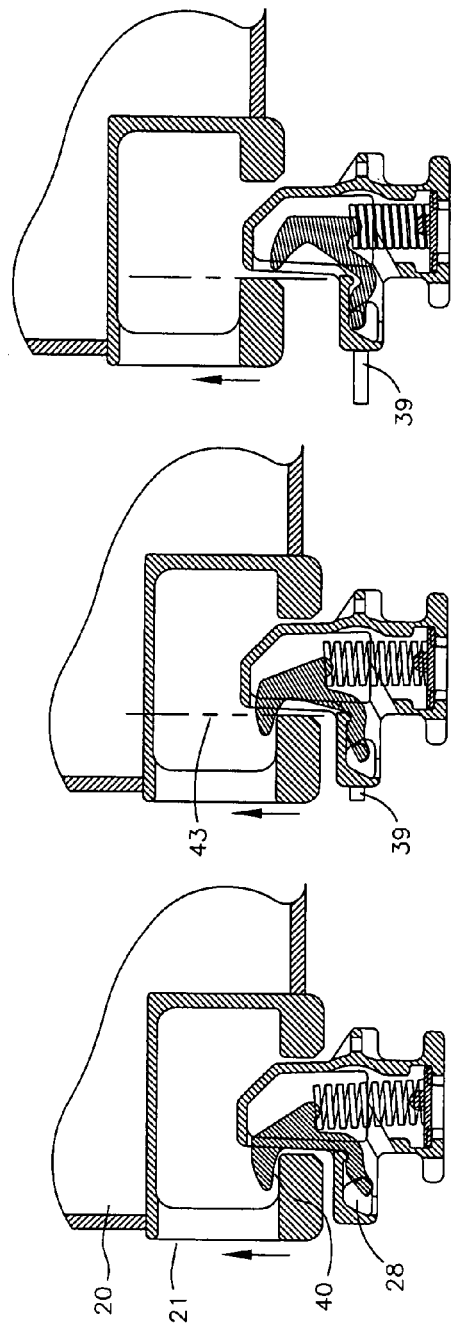
FIG. 37 is a sectional side elevational view showing the positions of the latch devices internal latch and spring, just prior to the cargo containers corner fitting being removed from the device and also illustrating the end of the indicator is not substantially extending outward from the front of the housing.
FIG. 38 is a sectional side elevational view showing the positions of the latch devices internal latch and spring, during partial removal of the cargo containers corner fitting from the device and also illustrating the end of the indicator partially extending outward from the front of the housing.
FIG. 39 is a sectional side elevational view showing the positions of the latch devices internal latch and spring, retracted into the devices housing just after the cargo containers corner fitting has been removed from the device and also illustrating the end of the indicator further extending outward from the front of the housing.
FIG. 40 is a sectional side elevational view showing the positions of the latch devices internal latch and spring, just prior to the cargo containers corner fitting engaging with the device and also illustrating the end of the indicator is not substantially extending outward from the front of the housing.
FIG. 41 is a sectional side elevational view showing the positions of the latch devices internal latch and spring, retracted into the devices housing just after the cargo containers corner fitting has been engaged onto the device and also illustrating the end of the indicator extending outward from the front of the housing.

No. 7,114,898, issued to the present author, the specification of which is hereby incorporated by reference thereto insofar as the same may be said to support the teachings of the present latch device 10. Latch 12 of latch device 10 is not guided and restrained by a pin, however. Line action 43 defines the travel line which the contact surfaces of corner casting 21 of a standard cargo container 20 travels along while it is engaging and being placed onto the latch device 10. Typically it is desired that latch surfaces 45 and 46 contacting and pivoting about internal housing pocket 28 at contact surfaces 47 and 48 be as far away and to the left of line action 43 which results in minimizing the mechanical force advantage of spring 14 as illustrated in FIG. 40. Minimizing the mechanical force advantage of spring 14 during the engagement motion of corner casting 21 aids in obtaining low applied forces and smooth engagement motion of latch 12.

A novel and unique feature of the present invention is the addition of certain visual indicating means as may be preferably defined by a visual indicator, such as indicator 39, so as to provide an improvement to the state of the art. The industry generally finds certain state of the art latches highly desirable for use. Occasionally, however, the location of container 20 is such that face opening 56 of corner fitting 21 is not positioned in a manner to provide railroad personnel the ability to visibly inspect through face opening 56 of corner fitting 21 the position of latch surfaces 40 and 41 to verify that they are in the proper position to provide the desired performance of a latching device. The addition of the novel and the unique use of cam link 36 and indicator 39 to the latch device 10 of the present invention provides the desired improvement and is further disclosed herein.

Figure 11:
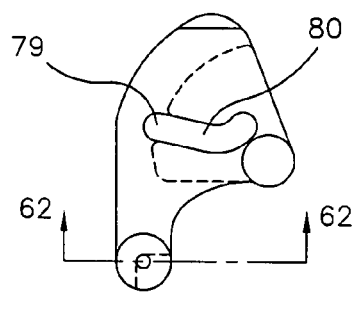
FIG. 11 is a side elevational view of the link arm for the latch device.
Figure 12:
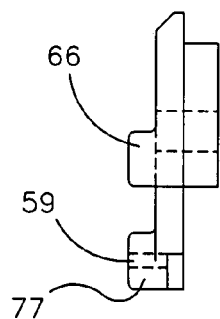
FIG. 12 is a frontal elevational view of the link arm for the latch device.
Figure 13:
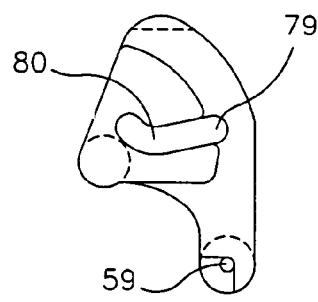
FIG. 13 is an opposite side elevational view of the link arm for the latch device.
Figure 14:
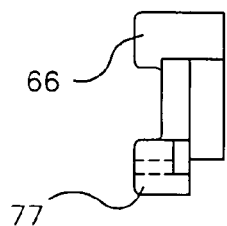
FIG. 14 is a bottom plan view of the link arm for the latch device.
Figure 21:
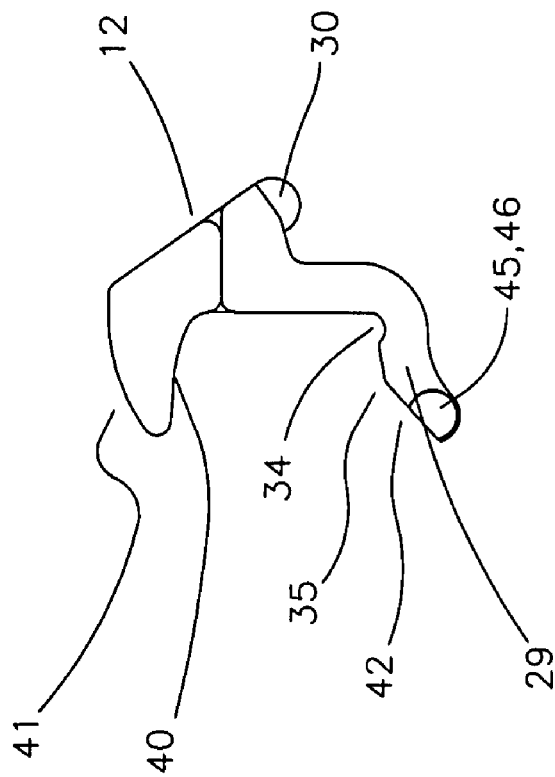
FIG. 21 is a side elevational view of the latch for the latch device.
Figure 20:
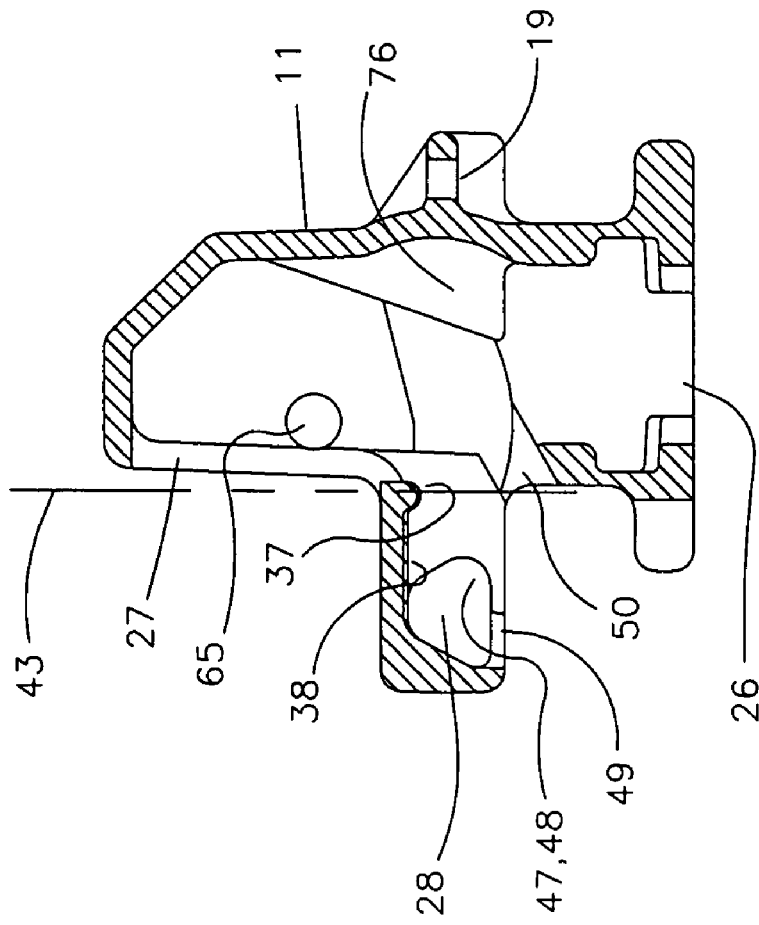
FIG. 20 is a sectional side elevational view of the housing for the latch device.

A further unique feature of the latch device 10 is how the device is assembled and its components housing 11, latch 12, retainer 13, spring 14, link arm 36 and indicator 39 are held together in relation to each other. To help the reader understand latch assembly of latch device 10, the reader is directed to FIG. 16, which figure illustrates a sectional bottom view of the initial assembly of the indicator clip end 58 starting to be inserted into the bottom hub cavity 59 of link arm 36 taken along line 62 shown in FIG. 11. The preferred indicator 39 comprises a flexible tubular clip 60 attached to a larger diametrical flexible tubular body 57. It is desired that flexible tubular clip 60 be kept to a minimum diametrical size so as to keep the bottom hub cavity 59 of link arm 36 as small as practical to fit within the limited internal space of housing 11. The desired material for flexible tubular clip 60 is stainless steel which is sized to provide the desired flexibility, strength and corrosion resistance. Also, it is desired that flexible tubular body 57 be kept to a maximum diametrical size so as to provide as large as possible visual appearance for field personnel. The desired material for flexible tubular body 57 is a non-metallic polymer which will provide the desired flexibility, strength and corrosion resistance. The desired method is to overmold one end of flexible tubular clip 60 with an appropriate non-metallic polymer to form indicator 39 as illustrated in FIG. 15.

The desired material for link arm 36 is a non-metallic polymer preferably Ultra High Molecular Weight Polyethylene (UHMWPE). Link arm 36 can easily be molded from the UHMWPE material and will exhibit strong, wear resistant and self-lubricating features for the desired operation as disclosed herein.

FIG. 17 illustrates a sectional bottom view of the indicator clip end 58 pushed through to the other end of bottom hub cavity 59 of link arm 36. Link arm 36 is then rotated through path 61 shown in FIG. 17 to its final seated position as shown in FIG. 18. The flexible tubular clip 60 of indicator 39 is sized to provide the desired flexibility necessary for this action. FIG. 19 illustrates a side elevational view of the structures otherwise depicted in FIG. 18.

Figure 27:
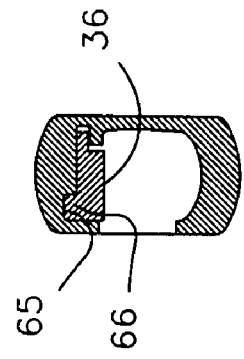
FIG. 27 is a sectional top plan view of the housing for the latch device taken along line 74 of FIG. 26 showing the said link arm seated within said housing cavity for the latch device ready for use.
Figure 25:
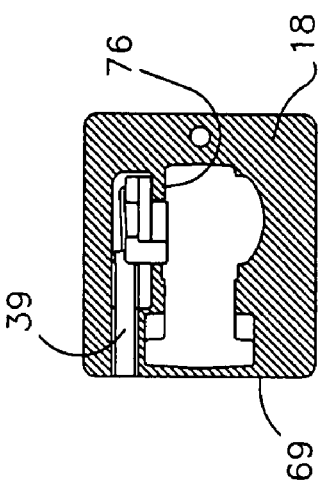
FIG. 25 is a sectional top plan view of the housing for the latch device showing the said flexible indicator and link arm assembly seated within said housing cavity for the latch device ready for use.
Figure 22:
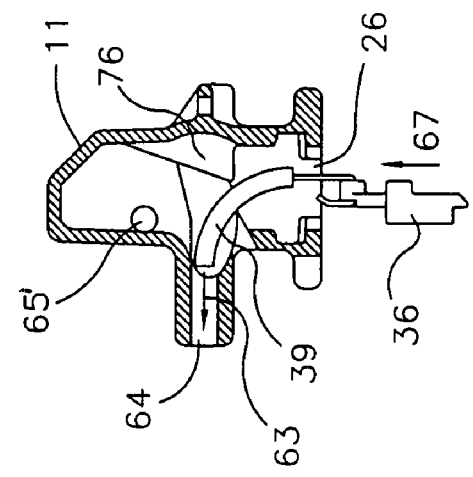
FIG. 22 is a sectional side elevational view of the housing for the latch device showing the initial insertion technique utilized for assembling the said flexible indicator and link arm assembly for the latch device.
Figure 23:
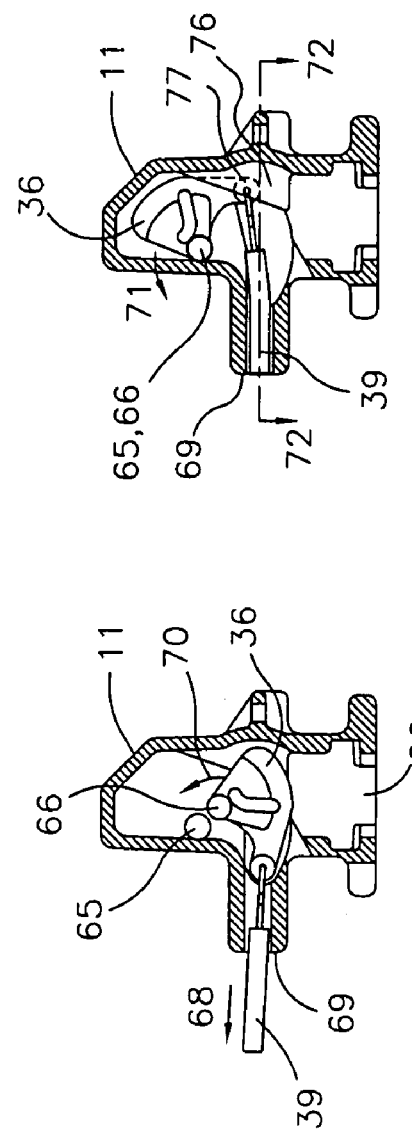
FIG. 23 is a sectional side elevational view of the housing for the latch device showing further insertion technique utilized for assembling the said flexible indicator and link arm assembly for the latch device.

Further assembly is accomplished by inserting flexible tubular body 57 of indicator 39 along path 67 through housing cavity opening 26 of housing 11 proceeding along path 63 through housing cavity 64 as shown in FIG. 22. Flexible tubular body 57 of indicator 39 follows along path 68 outward from front face 69 of base 18 of housing 11 so as to allow link arm 36 to be orientated and routed through the internal cavities of housing 11 and proceed along rotational path 70 as shown in FIG. 23. Link arm 36 proceeds along rotational path 71 to the position as shown in FIG. 24 thereby allowing link arm hub 77 to be tipped behind internal housing rib 76 and then tipped so link arm hub 66 is allowed to seat within housing cylindrical cavity 65 of housing 11. FIG. 24 also illustrates the desired position of link arm 36 and indicator 39 that results in the end of flexible tubular body 57 of indicator 39 being flush with front face 69 of base 18 of housing 11. FIG. 25 illustrates a sectional top plan view of base 18 taken along line 72 further highlighting the positional relationship of link arm 36, indicator 39 and internal housing rib 76 and adjacent cavities of base 18 of housing 11. FIG. 27 illustrates a sectional plan view along line 74 through housing 11 further highlighting link arm hub 66 seated within housing cylindrical cavity 65 of housing 11 along with illustrating the method that internal housing rib 76 aids with alignment of said link arm 36.

Figure 26:
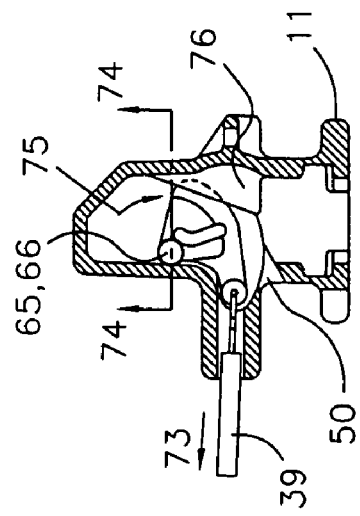
FIG. 26 is a sectional side elevational view of the housing for the latch device showing the said flexible indicator end transposed out of the said housing by the rotational translation of the link arm seated within said housing cavity for the latch device further illustrating said usage.

Indicator 39 is transposed out from housing face 69 along path 73 when link arm 36 is rotationally transposed about link arm hub 66 as shown in FIG. 26. Further illustrated is how internal housing rib 76 aids with alignment and prevention of said link arm 36 dislodging from the desired path 73.

Figure 28:
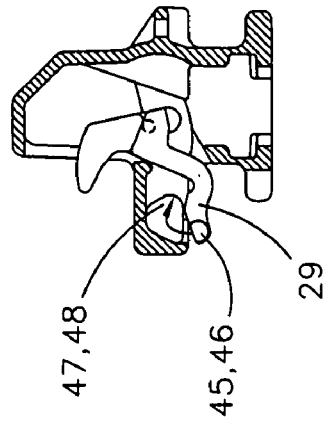
FIG. 28 is a sectional side elevational view of the housing for the latch device showing the initial insertion technique utilized for assembling the said latch that contains two stub protrusions on the end of the leg.
Figure 29:
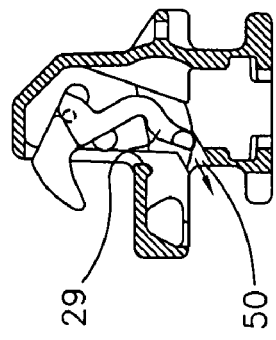
FIG. 29 is a sectional side elevational view of the housing for the latch device showing the secondary assembly path utilized for assembling the said alternate latch that contains two stub protrusions on the end of the leg, the two stub protrusions on the end of the leg are being inserted through the frontal cavity shown in FIG. 5.
Figure 30:
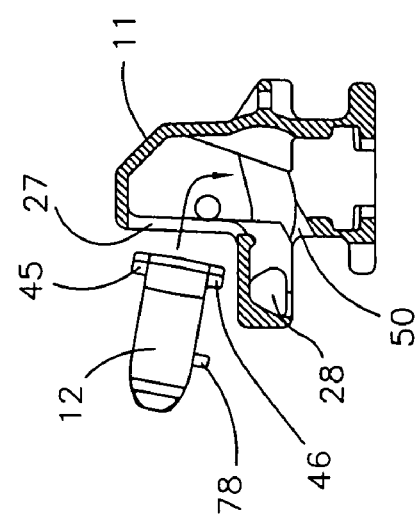
FIG. 30 is a sectional side elevational view of the housing for the latch device showing the final assembly path utilized for assembling the said latch that contains two stub protrusions on the end of the leg, the two stub protrusions on the end of the leg are being inserted through the bottom cavity shown in FIGS. 8 and 9.
Figure 31:
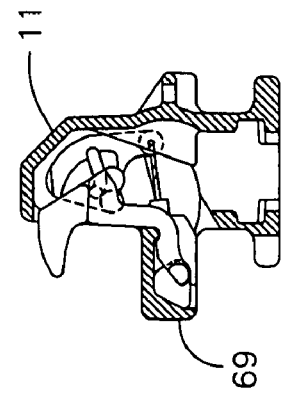
FIG. 31 is a sectional side elevational view of the housing for the latch device showing the transposing assembly path utilized for aligning the pin protrusion of the said latch with the cam profile pocket of the said link arm and also illustrating the end of the indicator extending outward from the front of the housing.
Figure 32:
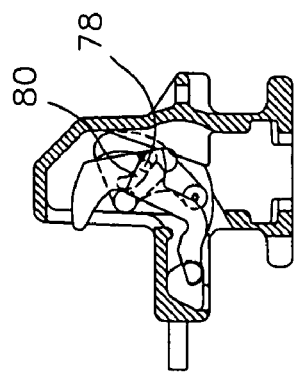
FIG. 32 is a sectional side elevational view of the housing for the latch device showing the transposed assembly path when the pin protrusion of the said latch is within the cam profile pocket of the said link arm and also illustrating the end of the indicator extending outward from the front of the housing.
Figure 33:
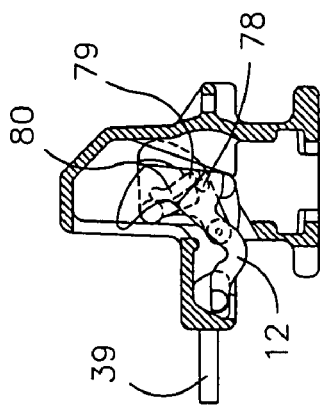
FIG. 33 is a sectional side elevational view of the housing for the latch device showing the transposed position of the said latch, link arm and indicator when in the substantially ready position for use and also illustrating the end of the indicator is not substantially extending outward from the front of the housing.

FIGS. 28, 29 and 30 illustrate the installation technique of latch 12 where link arm 36 and indicator 39 have been removed for clarity. Stub protrusions 45 and 46 of latch 12 are first inserted into cavity opening 27 of housing 11 and then positioned into the internal pocket 28 as shown in FIG. 37. FIGS. 31, 32 and 33 illustrate the translation technique of latch 12 where latch pin 78 is first aligned with cam cavity end 79 of cam cavity 80 of link arm 36. FIG. 33 shows the desired positional relationship of link arm 36, indicator 39, latch pin 78 within cam cavity 80 of latch 12 and internal housing rib 76 and adjacent cavities of housing 11 along with illustrating that the indicator end is substantially flush with front face 69 of base 18 of housing 11.

Figure 36:
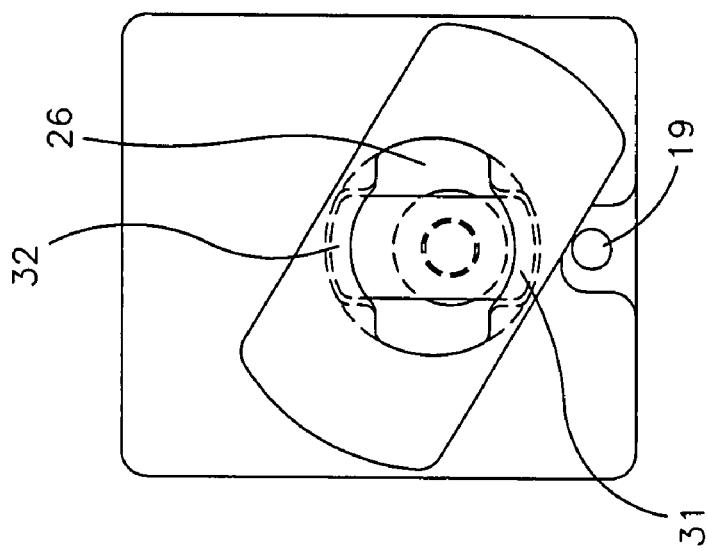
FIG. 36 is a bottom plan view of the latch device showing the end of a spring in the housings slot cavity and the retainer turned and secured to captivate the internal spring and latch appropriately.
Figure 35:
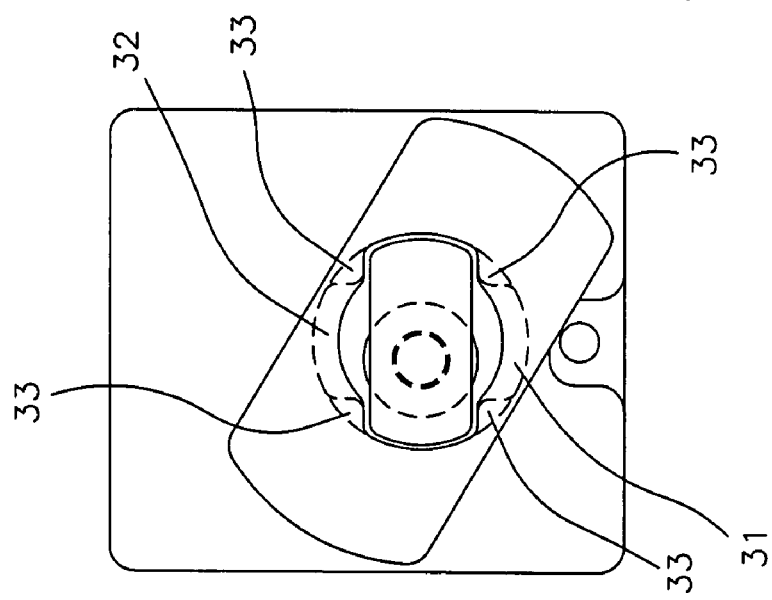
FIG. 35 is a bottom plan view of the latch device showing the end of a spring in the housings slot cavity and the retainer placed on top of the spring appropriately.
Figure 34:
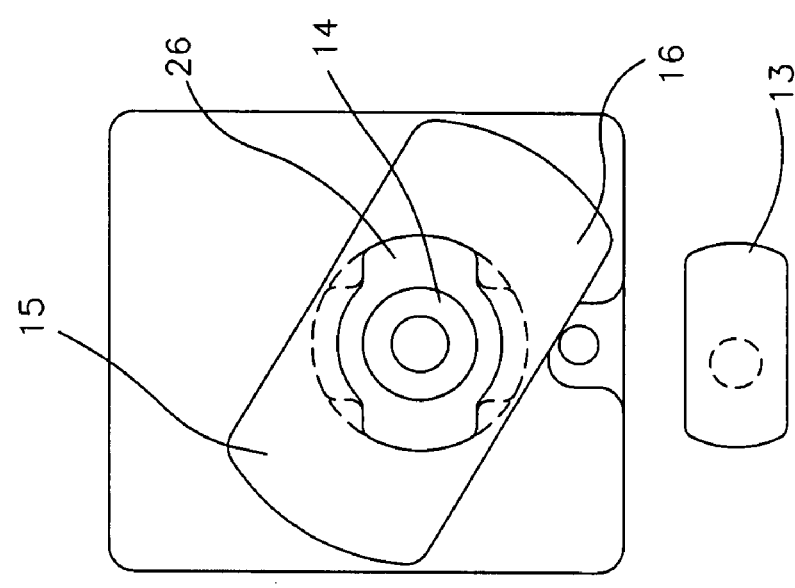
FIG. 34 is a bottom plan view of the latch device showing the end of a spring in the housings slot cavity and a view of the appropriate retainer.

Spring 14 is preferably a typical metal compression or die spring, and is inserted through cavity opening 26 of housing 11 with one end on the spring 14 being positioned onto the protrusion 30 of latch 12. FIG. 34 is a bottom plan view of latch device 10 showing the end of a spring 14 in the housing cavity opening 26 and a view of the appropriate retainer 13. Retainer 13 is orientated and placed into housing cavity-opening 26 on top of the end of spring 14 as shown in FIG. 35. An appropriate assembly force is applied to retainer 13 compressing spring 14 so as to push retainer 13 into housing cavity opening 26 past tabs 31 and 32 and four internal nubs 33. Retainer 13 is then rotated appropriately as shown in FIG. 36 and become aligned with tabs 31 and 32 and the four internal nubs. The assembly force that has been applied to retainer 13 is removed and this results in retainer 13 backing out of the housing cavity 26 and bearing against tabs 31 and 32 which prevents complete removal of retainer 13. The four internal nubs 33 traps the retainer 13 into the desired position holding the parts together and prevents retainer 13 from rotating and inadvertently aligning itself with housing cavity 26 which would allow the parts to come loose. To disassemble latch device 10, the order of these steps is reversed.

Another feature of the latch device 10 is that it has an integral attachment feature 19. This feature 19 allows an appropriate chain or cable to be attached to housing 11 which in turn secures latch device 10 to a deck 22 or frame of a vehicle. Attachment feature 19 is typically a through hole and the reason for this type of integral attachment feature is to deter theft of latch device 10 when it is desired for it to be removed from an appropriate structure and surface 25 from a vehicle deck 22 but yet remain with the vehicle. Latch device 10 is to be capable of being removed from the appropriate structure and surface 25 and stowed in an appropriate area on the vehicle so the latch device 10 will not be in the way for other types of lading when cargo containers are not being transported.

Latch device 10 further utilizes a latch 12 that is contoured and functionally matched to fit within the internal contours of housing 11 and be restrained by the resulting geometry. FIGS. 37 through 41 show sectional views of latch device 10 at various operational stages of engaging and disengaging with a corner casting 21 of a standard cargo container 20. The illustrations in FIGS. 38, 39 and 41 depict how this invention departs from the state of the art by way of the exposed visual indicator 39 when latch 12 is disposed into housing 11. By way of comparison, the illustrations in FIGS. 37 and 40 depict how this invention departs from the state of the art by way of the visual indicator 39 being substantially flush with front face 69 of base 18 of housing 11 when latch 12 is not disposed into housing 11.

FIG. 37 represents the earliest operational stage of when a corner casting 21 of a standard cargo container 20 is being removed off of the latch device 10 and is starting to make contact with the concave underside 40 of latch 12. It is to be observed that latch 12 is secured in the internal pocket 28 of housing 11 by its leg 29, and the indicator 39 is substantially flush with front face 69 of base 18 of housing 11. Latch surfaces 34, 45 and 46 contact internal housing pocket 28 at surfaces 37, 47 and 48 respectively. Spring 14 is positioned onto the protrusion 30 of latch 12 thereby assuring that latch 12 is secured into proper position. As corner casting 21 of a standard cargo container 20 is being removed off of the latch device 10, it is in contact with the concave underside 40 of latch 12. It is to be observed that latch 12 pivots in the internal pocket 28 of housing 11 by its leg 29. Latch surface 34 contacts and pivots about internal housing pocket 28 at surface 37. Spring 14 is positioned onto the protrusion 30 of latch 12 thereby assuring that latch 12 translates and pivots through the desired motion. The actual location and shape of latch surface 34 and internal housing surface 37 is allowed to be tailored as desired to obtain the desired release action of the latch device 10. During the latch 12 pivoting action described and shown in FIGS. 38 and 39 it is further observed that indicator 39 extends out of housing 11 visibly indicating such action.

FIG. 38 represents the operational stage of when a corner casting 21 of a standard cargo container 20 is being removed off of the latch device 10 and is making contact with the concave underside 40 of latch 12. It is to be observed that latch 12 has pivoted and rotated in the internal pocket 28 of housing 11 by its Leg 29. FIG. 38 shows that latch surface 35 is now coming into contact and pivoting about internal housing pocket 28 at surface 38. Spring 14 is positioned onto the protrusion 30 of latch 12 thereby assuring that latch 12 translates and pivots through the desired motion. The actual location and shape of latch surfaces 34 and 35 and internal housing surfaces 37 and 38 are allowed to be tailored as desired to obtain the desired release action of the latch device 10.

FIG. 39 represents an operational stage subsequent to the state depicted in FIG. 38 when a corner casting 21 of a standard cargo container 20 is being removed off of the latch device 10 and clears contact with the concave underside 40 of latch 12. It is to be observed that latch 12 is pivoting in the internal pocket 28 of housing 11 by its leg 29. FIG. 39 shows latch surface 35 contacting and pivoting about internal housing pocket 28 at surface 38. It is allowed for latch surface 42 to be contoured and to contact and pivot about internal housing pocket 28 at surface 38 to obtain the desired release effect of latch device 10. Spring 14 is positioned onto the protrusion 30 of latch 12 for assuring that latch 12 translates and pivots through the desired motion. The actual location and shape of latch surfaces 34, 35 and 42 and internal housing surfaces 37 and 38 are allowed to be tailored as desired to obtain the desired release action of the latch device 10.

FIG. 40 represents the earliest operational stage of when a corner casting 21 of a standard cargo container 20 is engaging with latch device 10 and is starting to make contact with the convex upper-side 41 of latch 12. It is to be observed that latch 12 is secured in the internal pocket 28 of housing 11 by its leg 29. Latch surfaces 34, 45 and 46 contact internal housing pocket 28 at surfaces 37, 47 and 48 respectively. Spring 14 is positioned onto the protrusion 30 of latch 12 for assuring that latch 12 is secured into proper position. As corner casting 21 of a standard cargo container 20 is engaging the latch device 10, it is in contact with the convex upper-side 41 of latch 12. It is to be observed that latch 12 is pivoting in the internal pocket 28 of housing 11 by its leg 29. Latch surfaces 45 and 46 contact and pivot about internal housing pocket 28 at surfaces 47 and 48. Spring 14 is positioned onto the protrusion 30 of latch 12 for assuring that latch 12 translates and pivots through the desired motion. The actual location and shape of latch surfaces 45 and 46 and internal housing surfaces 47 and 48 are allowed to be tailored as desired to obtain the desired engagement action of the latch device 10.

FIG. 41 represents a subsequent operational stage to the state otherwise depicted in FIG. 40 when a corner casting 21 of a standard cargo container 20 is being engaged onto latch device 10 and clears contact with the convex upper-side 41 of latch 12. It is to be observed that latch 12 is pivoting in the internal pocket 28 of housing 11 by its leg 29. FIG. 41 shows latch surfaces 45 and 46 contacting and pivoting about internal housing pocket 28 at surfaces 47 and 48. Spring 14 is positioned onto the protrusion 30 of latch 12 for assuring that latch 12 translates and pivots through the desired motion. The actual location and shape of latch surfaces 45 and 46 and internal housing surfaces 47 and 48 are allowed to be tailored as desired to obtain the desired release action of the latch device 10. During the latch 12 pivoting action described and shown in FIG. 41 it is further observed that indicator 39 extends out of housing 11 visibly indicating such action.

Figure 42:
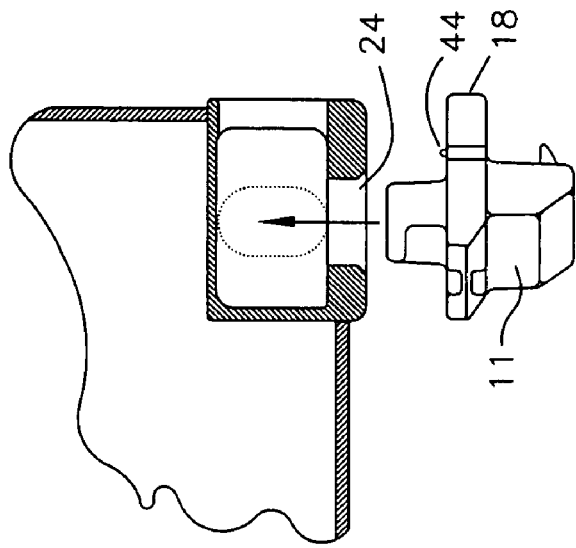
FIG. 42 is a lateral side elevational view of the latch device appropriately rotated so its bottom flanges are orientated with a cargo container corner casting aperture.

An optional unique feature of the latch device 10 is that for double cargo container stacking it may be desirable to include an integral retractable plunger feature 44. FIG. 42 is a side elevational view of latch device 10 appropriately rotated so its bottom flanges 15 and 16 are orientated with a cargo container corner casting aperture 24. The integral retractable plunger feature 44 points out from base 18 of housing 11. As latch device 10 is raised into cargo container corner casting aperture 24 as shown in FIG. 43, the plunger feature 44 automatically retracts out of the way into the base 18 of housing 11.

Figure 44:
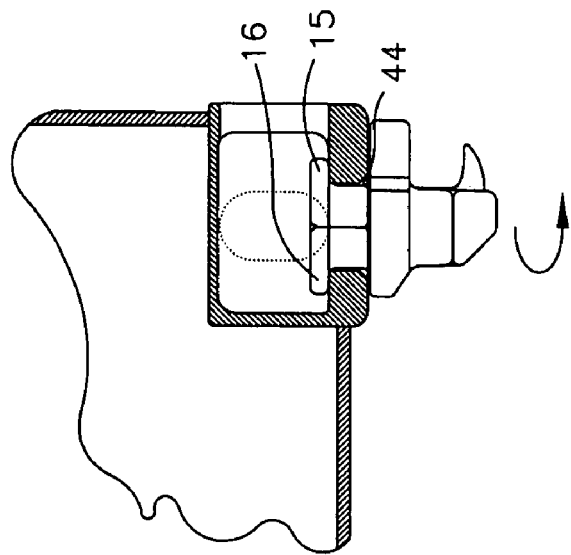
FIG. 44 is a lateral side elevational view of the latch device appropriately rotated so its bottom flanges are orientated to retain the latch device in a cargo container corner casting aperture.
Figure 47:
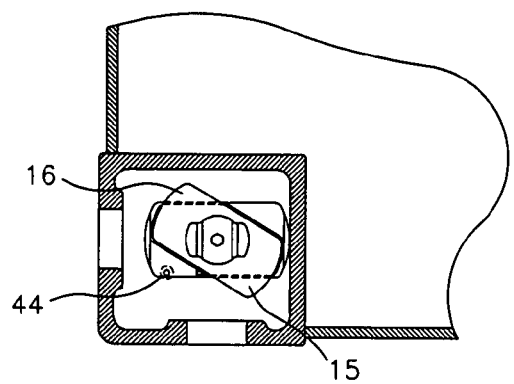
FIG. 47 is a sectional horizontal view of the cargo containers bottom corner casting shown in FIG. 3. The captivated flanged end of the latch device is clarified.
Figure 45:
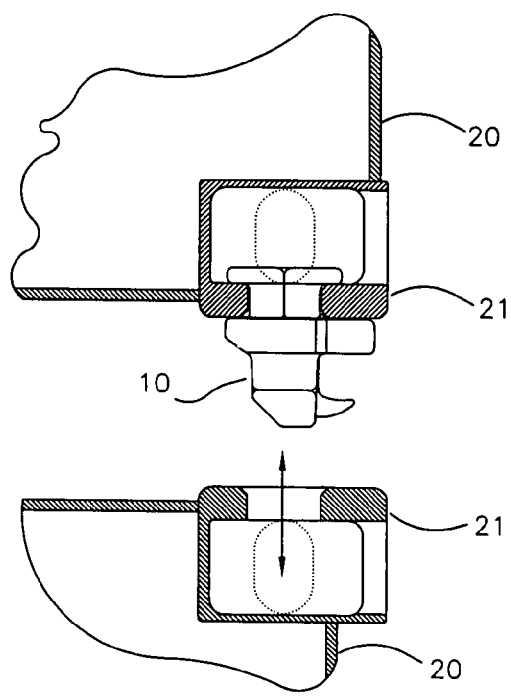
FIG. 45 is a lateral side elevational view of the latch device appropriately retained in a cargo containers bottom corner casting aligned and ready to be lowered down onto another cargo containers top corner casting.
Figure 46:
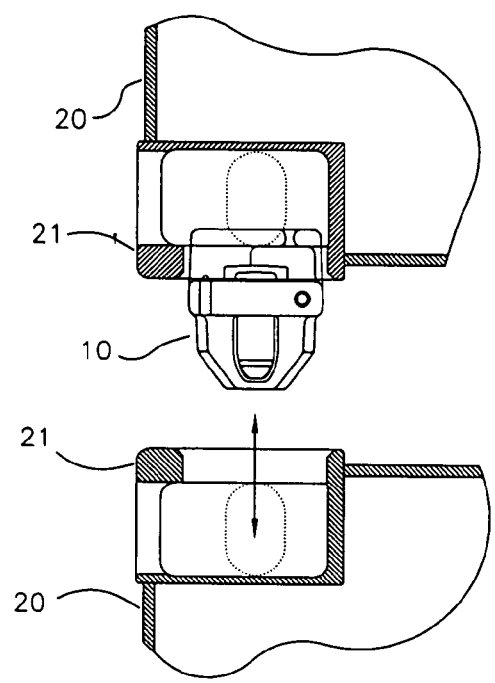
FIG. 46 is a longitudinal side elevational view of the latch device appropriately retained in a cargo containers bottom corner casting aligned and ready to be lowered down onto another cargo containers top corner casting.

The latch device 10 is then rotated while in the cargo container corner casting aperture 24 as shown in FIG. 44 so flanges 15 and 16 prevent removal of latch device 10 from corner casting 21 of a standard cargo container 20. When latch device 10 has been rotated into the desired position, the plunger feature 44 automatically raises out of base 18 of housing 11 into the open area of the cargo container corner casting aperture 24. A horizontal sectional view of corner casting 21 of a standard cargo container 20 in FIG. 47 shows a planar view of plunger feature 44 in corner casting aperture 24. Latch device 10 is prevented from inadvertently coming loose and falling out of corner casting 21 while the standard cargo container 20 is being positioned during loading or unloading operations because the plunger feature 44 has been raised out of base 18 and into the open clear area in corner casting aperture 24.

Figure 43:
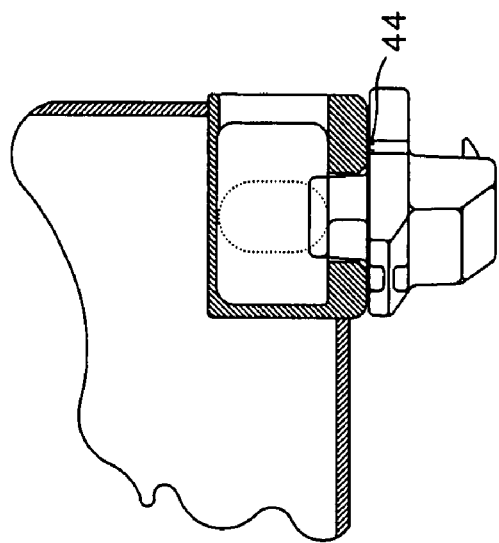
FIG. 43 is a lateral side elevational view of the latch device appropriately rotated so its bottom flanges are orientated with a cargo container corner casting aperture and raised up into the aperture.

To remove latch device 10 from corner casting 21 one has to grasp the extending part of housing 11 of latch device 10 and manually rotate the latch device 10 about it's axis in such a manner to realign flanges 15 and 16 with corner casting aperture 24 as shown in FIG. 43. This rotation action results in plunger feature 44 to bear up against the cargo container corner casting aperture 24 cast surfaces and automatically retract back into base 18 of housing 11 no longer acting as a deterrent to removal of latch device 10. Latch device 10 may then be lowered down out of corner casting aperture 24 as shown in FIG. 42.

It is thus contemplated that the present invention may be said to disclose a cargo container hold down arrangement for cargo containers 20 of a generally cuboid type configuration having an underside with four corners, wherein the four corners of the underside of the cargo containers 20 are each equipped with a corner fitting 21 for the purpose of securing the cargo containers 20 to a platform that is substantially horizontally disposed. Sets of the corner fittings 21 are preferably being disposed in co-planar relation to one another and each of the corner fittings 21 may be said to define a similar locking opening as at 24 and a planar bearing surface (as at 18 in FIG. 2) that are respectively disposed adjacent the locking openings or apertures 24 of the respective corner fittings 21. A cargo container securement device or latch device 10 is outfitted upon the platform or vehicle deck as at support 22 for each of the respective corner fittings 21 for securing the cargo container 20 to the platform.

Figure 7:
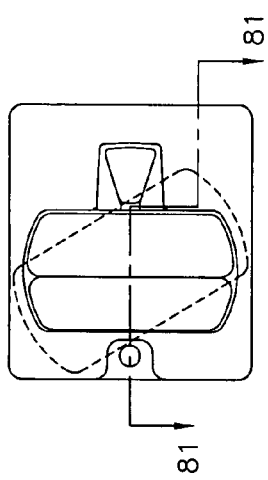
FIG. 7 is a top plan view of the latch device for cargo containers.
Figure 5:
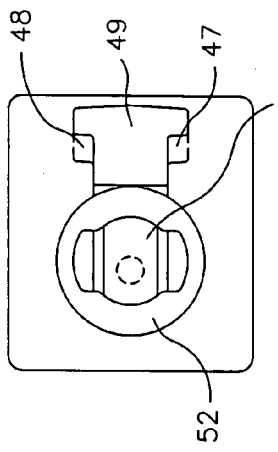
FIG. 5 is a frontal elevational view of the latch device for cargo containers.
Figure 8:
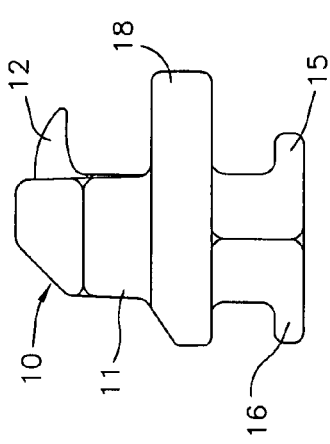
FIG. 8 is a bottom plan view of the latch device for cargo containers.
Figure 6:
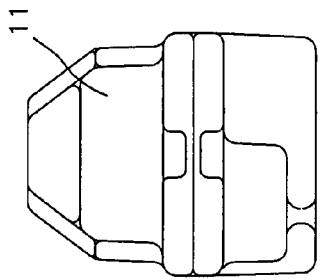
FIG. 6 is a back elevational view of the latch device for cargo containers.
Figure 10:
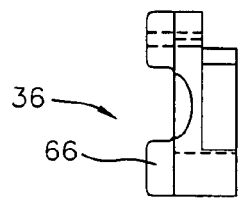
FIG. 10 is a top plan view of the link arm for the latch device.

The securement devices 10 each comprise a shear block assembly as generally depicted in FIGS. 4-9, inclusive. It may be seen from an inspection of the figures that the illustrated shear block assembly preferably comprises a front side or face as generally depicted in FIG. 5; an imperforate top side as generally depicted in FIG. 7; and an imperforate back side as generally depicted in FIG. 6. The shear block or housing 11 further comprises a base portion 18 defining a planar force transmitting first surfacing portion (generally depicted in FIG. 2) that extends to either side of the base portion 18, and a projecting portion or housing 11 that is generally normal to the planar bearing surface. The projecting portion 11 of the shear block assembly comprises an internal chamber that is open at said front side of the shear block assembly. The shear block base portion 18 also has a second force transmitting surfacing portion (generally depicted in FIG. 3) for engagement with the platform or support 22.

The shear block assembly includes a latch member 12 pivotally mounted, but unpinned, in the internal chamber, for pivotal movement therein in a plane that is normally disposed relative to said front and back sides of said shear block assembly, and that is about a latch member pivot axis that is normal of said plane. The latch member 12 includes a nose portion having an upper cam surfacing means (as at 41) for engagement by the bearing surface of a correspondingly located container mounted fitting 21; and an under cam surfacing means (as at 40) for engagement by the planar bearing surface of such correspondingly located container mounted fitting 21 for removal of a fitting-bearing cargo container 20 from the platform or support 22.

The shear block assembly further comprises certain resilient means for biasing the latch member 12 to dispose the nose portion thereof exteriorly of the shear block opening in the front side thereof when said cam surfacing means 40 and 41 are not in use. The resilient means may be said to comprise (1) a resilient member (as at 14) interposed between said latch member 12 and the base portion 18 opposite a tail portion of the latch member 12; (2) certain means for effecting deflection of the latch member 12 via its nose portion and upper cam surfacing means about its pivot axis to within the shear block assembly when a cargo container 10 is lowered upon the latch member 12; and certain means for effecting deflection of the latch member 12 about a second pivot axis spaced frontwise from and parallel to the first or previously described pivot axis within the shear block assembly on engagement of a correspondingly located container corner fitting 21 as a cargo container is being removed from the platform or support 22. The separate or second pivot axis is disposed adjacent a level of the second force transmitting surfacing portion of the shear block.

The shear block assembly further comprises a link arm member (as at 36), which member 36 includes a hub portion for pivotal mounting in the shear block assembly for enabling pivotal movement of the link arm member 36 therein in a plane that is normally disposed relative to the latch member 12. The link arm member 36 further includes a cam cavity (as at 79) for forced translation by a mounted pin of the latch member 12, and hub portion for pivotally mounting a preferably flexible indicator member 39 for forcibly translating said indicator member 39 through the shear block base portion 18. The indicator member 39 includes a clip end for engagement with the hub portion of the link arm member 36, and tubular end for translating through the shear block base portion 18 and providing visual indicating means of latch configuration.

While the foregoing sets forth much specificity, the same has not been presented with a view toward limiting the scope of the invention. Although the invention is described with respect to a preferred embodiment, modifications thereto will be apparent to those skilled in the art. For example, the invention may be said to teach a container securement device for use with the corner fittings of a cargo container for securing the cargo container to a platform, which securement device comprises a shear block, a latch member, a resilient member, a link arm member, and an indicator member. The shear block defines a front side, a top side, and a back side, and forms a base portion. The base portion defines a first planar force transmitting surfacing portion that extends to either side of the base portion, and a projecting portion that is generally normal to the planar surfacing portion.

The shear block further defines an internal chamber that in the projecting portion of said shear block is open at said front side of the shear block. The shear block base portion defines a second force transmitting surfacing portion for engagement with a platform or support, and includes an unpinned latch member pivotally mounted in the chamber for movement therein in a plane that is normally disposed relative to the front and back sides of the shear block, and that is about a pivot axis that is normal of such plane. The latch member includes a nose portion having an upper cam surface, which upper cam surface engages a first bearing surfacing of a container mounted fitting during cargo container installation. The latch member also includes an under cam surface for engaging a second bearing surfacing of a correspondingly located container mounting fitting for removal of such container from such platform.

The resilient member functions to bias the latch member to exteriorly dispose the nose portion of the shear block opening in the front side thereof when the cam surfaces are not in use. The resilient member is interposed between the latch member and the base portion opposite a tail portion of the latch member. A first deflector is cooperably associated with the resilient member, which first deflector moves the latch member about a pivot axis to within the shear block on engagement of the cargo container as it is lowered upon the latch member nose portion upper cam surface. A second deflector associated with said resilient member moves the latch member within the shear block on engagement of a correspondingly located container corner fitting as the container is removed from the platform. The second deflector effects movement about a separate axis spaced parallel to the pivot axis of the latch member.

The link arm member includes a hub portion, which may be pivotally mounted in the shear block for movement therein in a plane that is normally disposed relative to the latch member. The link arm member comprises a cam cavity for translating a pin cooperably associated with the latch member, and for translating a pivotally mounted indicator member through the shear block base portion. The indicator member includes a clip end for pivotally mounted attachment to the hub portion of the link arm member, and a tubular end for translating through the shear block base portion and providing certain visual indicating means for enabling the user to easily ascertain or determine latch configuration.

It will be recalled that the teachings of the present specification may be viewed as improvement(s) over the teachings presented in U.S. Pat. No. 7,114,898. In this regard, the invention may be said embody an improved container securement device for use with a corner fitting of a cargo container for securing the cargo container to a platform wherein the old matter may be said to comprise a shear block, a latch member, and a resilient member, substantially as heretofore defined, and wherein the improvement may be said to comprise a link arm member and a indicator member or a indicator assembly comprising those elements. The link arm member comprises a hub portion, which hub portion is pivotally mounted within said shear block for movement therein in a plane that is normally disposed relative to said latch member. The indicator member comprises first and second member ends. The first member end is pivotally mounted to the hub portion, and the second member end is translatable through the base portion via link arm member movement for providing a visual indication of latch member configuration.

What is claimed is:

1. A cargo container hold down arrangement for a cargo container having an underside equipped with a plurality of corner fittings for purposes of securing the cargo container to a substantially horizontal platform, each of said corner fittings comprising a locking opening and a bearing surface, each corner fitting being securable via a container securement device, each container securement device comprising:

a shear block, the shear block having a front side, a top side, a back side, and a base portion, the base portion defining first and second force transmitting surfacing portions and a projecting portion, the first surfacing portion extending to either side of the base portion, the projecting portion being normal to a respective one of said bearing surfaces and comprising an internal chamber, the internal chamber being open at the front side, the second surfacing portion for engagement with the platform;

an unpinned latch member, the latch member being pivotally mounted within the internal chamber for movement therein in a plane that is normally disposed relative to said front and back sides of said shear block, and about a pivot axis that is normal of such plane; the latch member including a nose portion having an upper cam surfacing means for installing engagement with the bearing surface, and an under cam surfacing means for removing engagement with the bearing surface;

resilient means for biasing said latch member to dispose said nose portion thereof exteriorly of a shear block opening in said front side thereof when said cam surfacing means are not in use, said resilient means having a resilient member interposed between said latch member and said base portion opposite a tail portion of the latch member, means for effecting deflection of said latch member about said pivot axis to within the shear block on installing engagement of the bearing surface with the upper cam surfacing means, and means for effecting deflection of said latch member within the shear block on removing engagement from the bearing surface about a separate axis spaced frontwise from and parallel to said pivot axis;

a link arm member, the link arm member comprising a hub portion and a cam cavity, the hub portion being pivotally mounted in said shear block for movement therein in a plane that is normally disposed relative to said latch member; and an indicator member, the indicator member comprising a clip end and a tubular end, the clip end being pivotally mounted to the hub portion via the cam cavity, the tubular end being translatable through the base portion via link arm member movement for providing a visual indication of latch member configuration.

2. The securement device set forth in claim 1, wherein the top and back sides of said shear block are imperforate.

3. The securement device set forth in claim 1, wherein the indicator member consists of a flexible material.

4. A container securement device for use with a corner fitting of a cargo container for securing the cargo container to a platform, said securement device comprising:

a shear block, the shear block having a front side, a top side, a back side, and a base portion, the base portion defining first and second force transmitting surfacing portions and a projecting portion, the first surfacing portion for engagement with the corner fitting, the second surfacing portion for engagement with the platform, the projecting portion comprising an internal chamber, the internal chamber having an opening at the front side, a latch member, the latch member being pivotally mounted within the internal chamber for movement therein in a plane that is normally disposed relative to said front and back sides of said shear block, and about a pivot axis that is normal of such plane; the latch member including a nose portion having an upper cam surface for installing engagement with the corner fitting, and an under cam surfacing means for removing engagement with the corner fitting;

a resilient member biasing said latch member to dispose said nose portion exteriorly of said opening when said cam surfaces are not in use, said resilient member being interposed between said latch member and said base portion opposite a tail portion of the latch member;

a first deflector cooperably associated with said resilient member, said first deflector moving said latch member about said pivot axis to within the shear block on installing engagement intermediate the corner fitting and the upper cam surface;

a second deflector cooperably associated with said resilient member, said second deflector moving said latch member within the shear block on removing engagement from the corner fitting and about a separate axis parallel to said latch member pivot axis;

a link arm member, the link arm member comprising a hub portion, the hub portion being pivotally mounted in said shear block for movement therein in a plane that is normally disposed relative to said latch member; and an indicator member, the indicator member comprising first and second member ends, the first member end being pivotally mounted to the hub portion, the second member end being translatable through the base portion via link arm member movement for providing a visual indication of latch member configuration.

5. An improved container securement device for use with a corner fitting of a cargo container for securing the cargo container to a platform comprising a shear block, a latch member, and a resilient member, the shear block having a front side, a top side, a back side, and a base portion, the base portion defining first and second force transmitting surfacing portions and a projecting portion, the first surfacing portion extending to either side of the base portion, the projecting portion being normal to a bearing surface of the corner fitting and comprising an internal chamber, the internal chamber having a block opening at the front side, the second surfacing portion for engagement with the platform; the latch member being pivotally mounted within the internal chamber for movement therein in a plane that is normally disposed relative to said front and back sides of said shear block, and about a pivot axis that is normal of such plane; the latch member including a nose portion having an upper cam surfacing means for installing engagement with the bearing surface, and an under cam surfacing means for removing engagement with the bearing surface; the resilient member for biasing said latch member to dispose the nose portion thereof exteriorly through the block opening when said cam surfacing means are not in use, said resilient member being interposed between said latch member and said base portion opposite a tail portion of the latch member, first deflection means for effecting deflection of said latch member about said pivot axis to within the shear block on installing engagement of the bearing surface with the upper cam surfacing means being cooperable with the resilient member, and second deflection means for effecting deflection of said latch member within the shear block on removing engagement of the bearing surface about a separate axis spaced frontwise from and parallel to said pivot axis being cooperable with the resilient member, the improvement comprising:

a link arm member, the link arm member comprising a hub portion, the hub portion being pivotally mounted in said shear block for movement therein in a plane that is normally disposed relative to said latch member; and an indicator member, the indicator member comprising first and second member ends, the first member end being pivotally mounted to the hub portion, the second member end being translatable through the base portion via link arm member movement for providing a visual indication of latch member configuration.

6. A container securement device for use with a corner fitting of a cargo container for securing the cargo container to a platform, said securement device comprising:

a shear block assembly, the shear block assembly comprising a base portion and a projecting portion, the base portion defining first and second force transmitting surfacing portions, the first surfacing portion for engagement with the corner fitting, the second surfacing portion for engagement with the platform, the projecting portion comprising an internal chamber, the internal chamber comprising a chamber opening, a latch member, the latch member being pivotally mounted within the internal chamber for pivotal movement therein, the latch member comprising a nose portion having upper and under cam surfaces for engagement with the corner fitting;

a spring member, the spring member being interposed between said latch member and said base portion for biasing said nose portion exteriorly of the chamber opening when said cam surfaces are not in use;

a first deflector cooperably associated with said spring member, said first deflector moving said latch member about a pivot axis to within the shear block assembly during container installation;

a second deflector cooperably associated with said spring member, said second deflector moving said latch member within the shear block assembly about a separate axis parallel to the latch member pivot axis during container removal; and an indicator assembly, the indicator assembly comprising a link arm member and an indicator member, the link arm member being pivotally mounted within said shear block assembly, the indicator member comprising first and second member ends, the first member end being pivotally mounted to the link arm member, the second member end being translatable though the base portion via link arm member movement for providing a visual indication of latch member configuration.

\* \* \* \* \*